US012566920B2

(12) United States Patent
Sangarapillai

(10) Patent No.: US 12,566,920 B2
(45) Date of Patent: Mar. 3, 2026

(54) SYSTEM AND METHOD TO GENERATE AND ENHANCE DYNAMIC INTERACTIVE APPLICATIONS FROM NATURAL LANGUAGE USING ARTIFICIAL INTELLIGENCE

(71) Applicant: Brainweber Inc, Tampa, FL (US)

(72) Inventor: Sivashankar Sangarapillai, Tampa, FL (US)

(73) Assignee: Brainweber, Inc., Tampa, FL (US)

( * ) Notice: Subject to any disclaimer, the term of this patent is extended or adjusted under 35 U.S.C. 154(b) by 155 days.

(21) Appl. No.: 18/663,662

(22) Filed: May 14, 2024

(65) Prior Publication Data

US 2024/0386204 A1    Nov. 21, 2024

Related U.S. Application Data

(60) Provisional application No. 63/502,390, filed on May 15, 2023.

(51) Int. Cl.
*G06F 40/284*        (2020.01)
*G06F 16/26*         (2019.01)

(52) U.S. Cl.
CPC ........... *G06F 40/284* (2020.01); *G06F 16/26* (2019.01)

(58) Field of Classification Search
None
See application file for complete search history.

(56) References Cited

U.S. PATENT DOCUMENTS 12,099,781 B1 * 9/2024 Malladi ................... G06F 30/17
2020/0160458 A1 * 5/2020 Bodin ..................... G06F 40/30

* cited by examiner

*Primary Examiner* — Quynh H Nguyen
(74) *Attorney, Agent, or Firm* — Larson & Larson; Frank Liebenow

(57)        ABSTRACT

System and methods for generating and enhancing dynamic interactive applications using artificial intelligence include a system that receives requirements for an application in natural language and uses artificial intelligence to generate a functional application. Such generated application is then continuously enhanced and adjusted with additional user and system feedback provided through natural, markup, programming, and domain-specific languages.

11 Claims, 27 Drawing Sheets

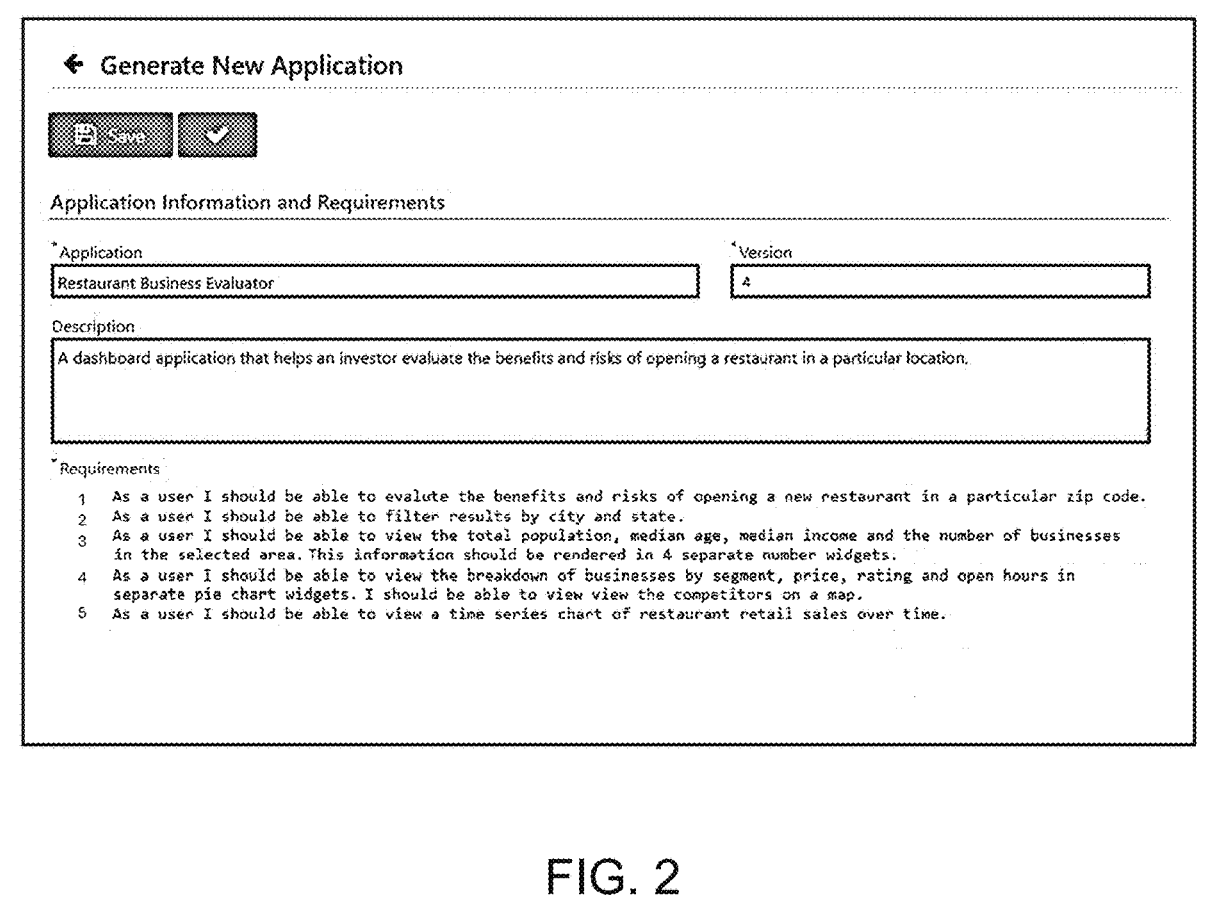

← Generate New Application

[ Save ]  [ ✓ ]

Application Information and Requirements

*Application
Restaurant Business Evaluator

*Version
A

Description
A dashboard application that helps an investor evaluate the benefits and risks of opening a restaurant in a particular location.

*Requirements
1   As a user I should be able to evaluate the benefits and risks of opening a new restaurant in a particular zip code.
2   As a user I should be able to filter results by city and state.
3   As a user I should be able to view the total population, median age, median income and the number of businesses in the selected area. This information should be rendered in 4 separate number widgets.
4   As a user I should be able to view the breakdown of businesses by segment, price, rating and open hours in separate pie chart widgets. I should be able to view view the competitors on a map.
5   As a user I should be able to view a time series chart of restaurant retail sales over time.

FIG. 2

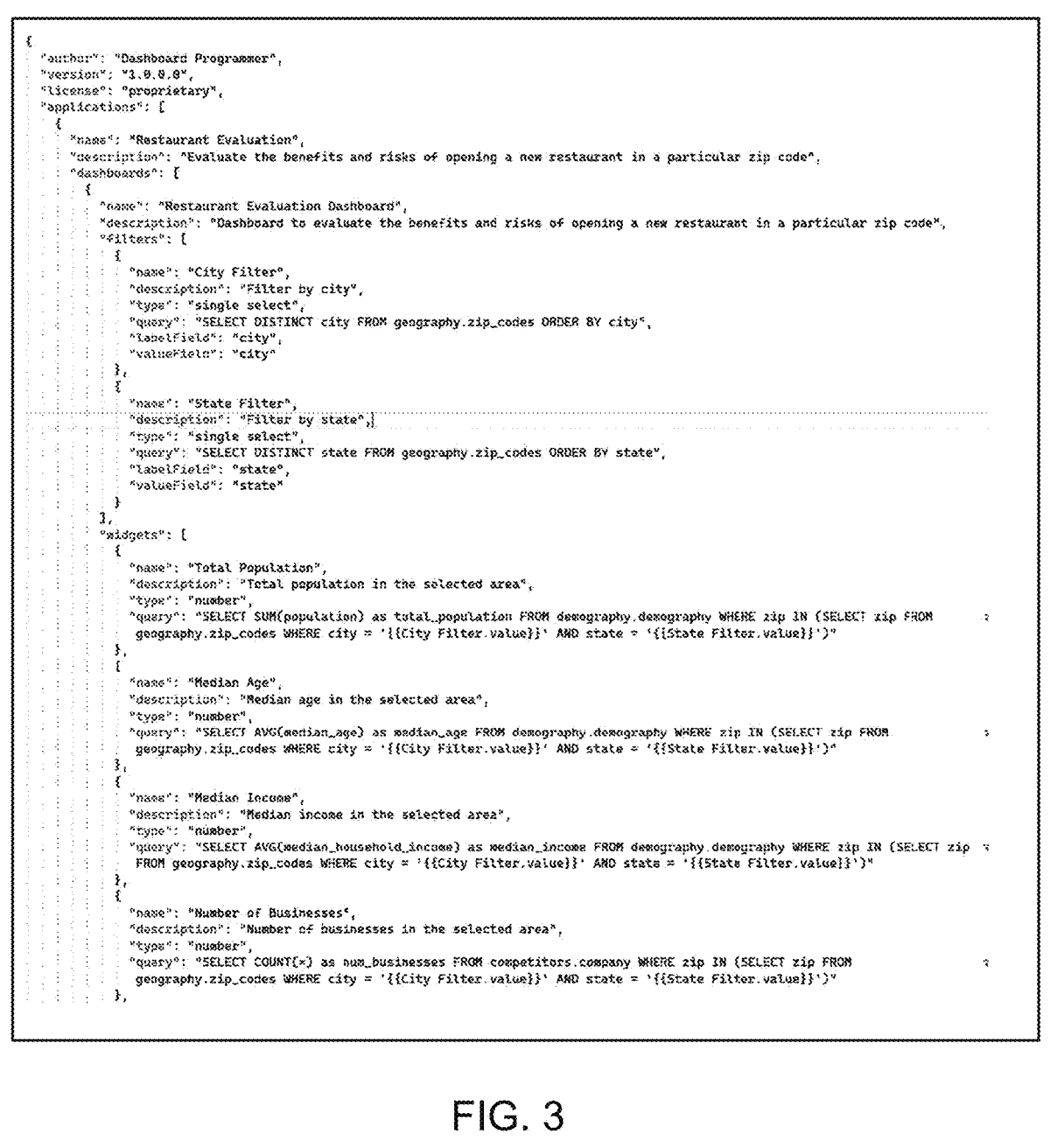

```json
{
  "author": "Dashboard Programmer",
  "version": "1.0.0.0",
  "license": "proprietary",
  "applications": [
    {
      "name": "Restaurant Evaluation",
      "description": "Evaluate the benefits and risks of opening a new restaurant in a particular zip code",
      "dashboards": [
        {
          "name": "Restaurant Evaluation Dashboard",
          "description": "Dashboard to evaluate the benefits and risks of opening a new restaurant in a particular zip code",
          "filters": [
            {
              "name": "City Filter",
              "description": "Filter by city",
              "type": "single select",
              "query": "SELECT DISTINCT city FROM geography.zip_codes ORDER BY city",
              "labelField": "city",
              "valueField": "city"
            },
            {
              "name": "State Filter",
              "description": "Filter by state",
              "type": "single select",
              "query": "SELECT DISTINCT state FROM geography.zip_codes ORDER BY state",
              "labelField": "state",
              "valueField": "state"
            }
          ],
          "widgets": [
            {
              "name": "Total Population",
              "description": "Total population in the selected area",
              "type": "number",
              "query": "SELECT SUM(population) as total_population FROM demography.demography WHERE zip IN (SELECT zip FROM geography.zip_codes WHERE city = '{{City Filter.value}}' AND state = '{{State Filter.value}}')"
            },
            {
              "name": "Median Age",
              "description": "Median age in the selected area",
              "type": "number",
              "query": "SELECT AVG(median_age) as median_age FROM demography.demography WHERE zip IN (SELECT zip FROM geography.zip_codes WHERE city = '{{City Filter.value}}' AND state = '{{State Filter.value}}')"
            },
            {
              "name": "Median Income",
              "description": "Median income in the selected area",
              "type": "number",
              "query": "SELECT AVG(median_household_income) as median_income FROM demography.demography WHERE zip IN (SELECT zip FROM geography.zip_codes WHERE city = '{{City Filter.value}}' AND state = '{{State Filter.value}}')"
            },
            {
              "name": "Number of Businesses",
              "description": "Number of businesses in the selected area",
              "type": "number",
              "query": "SELECT COUNT(*) as num_businesses FROM competitors.company WHERE zip IN (SELECT zip FROM geography.zip_codes WHERE city = '{{City Filter.value}}' AND state = '{{State Filter.value}}')"
            },
```

FIG. 3

```
{
  "requirements": [
    {
      "type": "story",
      "value": "As a user I should be able to evalute the benefits and risks of opening a new restaurant in a
      particular zip code",
      "context": "Data can be found in geography.public.zip_codes table."
    },
    {
      "type": "story",
      "value": "As a user I should be able to filter results by city and state.",
      "context": "Data can be found in geography.public.zip_codes table."
    },
    {
      "type": "story",
      "value": "As a user I should be able to view the total population, median age, median income and the number of
      businesses in the selected area in 4 number widgets.",
      "context": "Data can be found in demography.public.census_by_zip table."
    },
    {
      "type": "story",
      "value": "As a user I should be able to view the breakdown of businesses by segment, price, rating and open
      hours in separate pie chart widgets.",
      "context": "Data can be found in demography.public.census_by_zip table."
    },
    {
      "type": "story",
      "value": "As a user I should be able to view view the competitors on a map.",
      "context": "competitors.public.company table. Map widget requires latitude and longitude."
    },
    {
      "type": "story",
      "value": "As a user I should be able to view a time series chart of restaurant retail sales over time.",
      "context": "Data can be found in restaurant retail sales over time API."
    }
  ],
  "apis": [
    {
      "name": "restaurant retail sales over time",
      "url": "https://api.census.gov/data/timeseries/eits/marts?
      get=data_type_code,time_slot_id,seasonally_adj,category_code,cell_value,error_data&for=us:*&time=2022&category_
      code=7225&data_type_code=SM",
      "response": [
        [ "data_type_code", "time_slot_id", "seasonally_adj", "category_code", "cell_value", "error_data", "time",
        "category_code", "data_type_code", "us" ],
        [ "SM", "0", "no", "7225", "72750", "no", "2022-03", "7225", "SM", "1" ],
        [ "SM", "0", "no", "7225", "68875", "no", "2022-01", "7225", "SM", "1" ]
      ]
    }
  ],
  "databases": [
    {
      "name": "geography",
      "description": "Local geographic information",
      "type": "postgresql",
      "tables": [
        {
          "name": "zip_codes",
          "schema": "public",
          "description": "Zip code table",
          "columns": [
            {
              "name": "zip",
              "description": "Zip code",
              "type": "int"
            },
```

FIG. 9

```json
"author": "Dashboard Programmer",
"version": "1.0.0.0",
"license": "proprietary",
"applications": [
  {
    "name": "Restaurant Evaluation",
    "description": "Evaluate the benefits and risks of opening a new restaurant in a particular zip code",
    "dashboards": [
      {
        "name": "Restaurant Evaluation Dashboard",
        "description": "Dashboard to evaluate the benefits and risks of opening a new restaurant in a particular zip code",
        "filters": [
          {
            "name": "City Filter",
            "description": "Filter by city",
            "type": "single select",
            "query": "SELECT DISTINCT city FROM geography.zip_codes ORDER BY city",
            "labelField": "city",
            "valueField": "city"
          },
          {
            "name": "State Filter",
            "description": "Filter by state",
            "type": "single select",
            "query": "SELECT DISTINCT state FROM geography.zip_codes ORDER BY state",
            "labelField": "state",
            "valueField": "state"
          }
        ],
        "widgets": [
          {
            "name": "Total Population",
            "description": "Total population in the selected area",
            "type": "number",
            "query": "SELECT SUM(population) as total_population FROM demography.demography WHERE zip IN (SELECT zip FROM geography.zip_codes WHERE city = '{{City Filter.value}}' AND state = '{{State Filter.value}}')"
          },
          {
            "name": "Median Age",
            "description": "Median age in the selected area",
            "type": "number",
            "query": "SELECT AVG(median_age) as median_age FROM demography.demography WHERE zip IN (SELECT zip FROM geography.zip_codes WHERE city = '{{City Filter.value}}' AND state = '{{State Filter.value}}')"
          },
          {
            "name": "Median Income",
            "description": "Median income in the selected area",
            "type": "number",
            "query": "SELECT AVG(median_household_income) as median_income FROM demography.demography WHERE zip IN (SELECT zip FROM geography.zip_codes WHERE city = '{{City Filter.value}}' AND state = '{{State Filter.value}}')"
          },
          {
            "name": "Number of Businesses",
            "description": "Number of businesses in the selected area",
            "type": "number",
            "query": "SELECT COUNT(*) as num_businesses FROM competitors.company WHERE zip IN (SELECT zip FROM geography.zip_codes WHERE city = '{{City Filter.value}}' AND state = '{{State Filter.value}}')"
          },
          {
            "name": "Business Segment Breakdown",
            "description": "Breakdown of businesses by segment",
            "type": "chart",
            "query": "SELECT segment, COUNT(*) as num_businesses FROM competitors.company WHERE zip IN (SELECT zip FROM geography.zip_codes WHERE city = '{{City Filter.value}}' AND state = '{{State Filter.value}}') GROUP BY segment",
            "chartType": "pie",
            "chartOptions": {
              "xAxis": {
                "column": "segment"
              },
```

Figure 13:
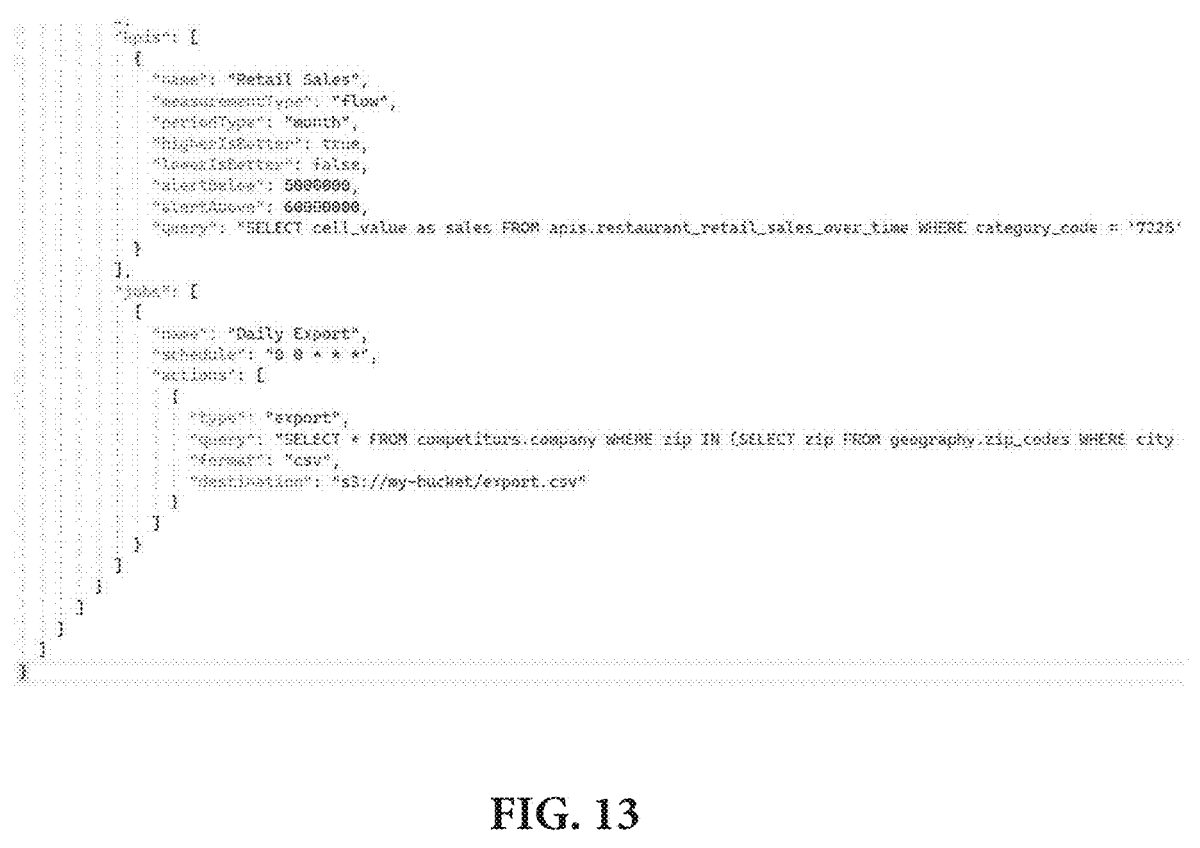

```
"kpis": [
    {
        "name": "Retail Sales",
        "measurementType": "flow",
        "periodType": "month",
        "higherIsBetter": true,
        "lowerIsBetter": false,
        "alertBelow": 5000000,
        "alertAbove": 60000000,
        "query": "SELECT cell_value as sales FROM apis.restaurant_retail_sales_over_time WHERE category_code = '7225'"
    }
],
"jobs": [
    {
        "name": "Daily Export",
        "schedule": "0 0 * * *",
        "actions": [
            {
                "type": "export",
                "query": "SELECT * FROM competitors.company WHERE zip IN (SELECT zip FROM geography.zip_codes WHERE city",
                "format": "csv",
                "destination": "s3://my-bucket/export.csv"
            }
        ]
    }
]
}
```

Figure 17:
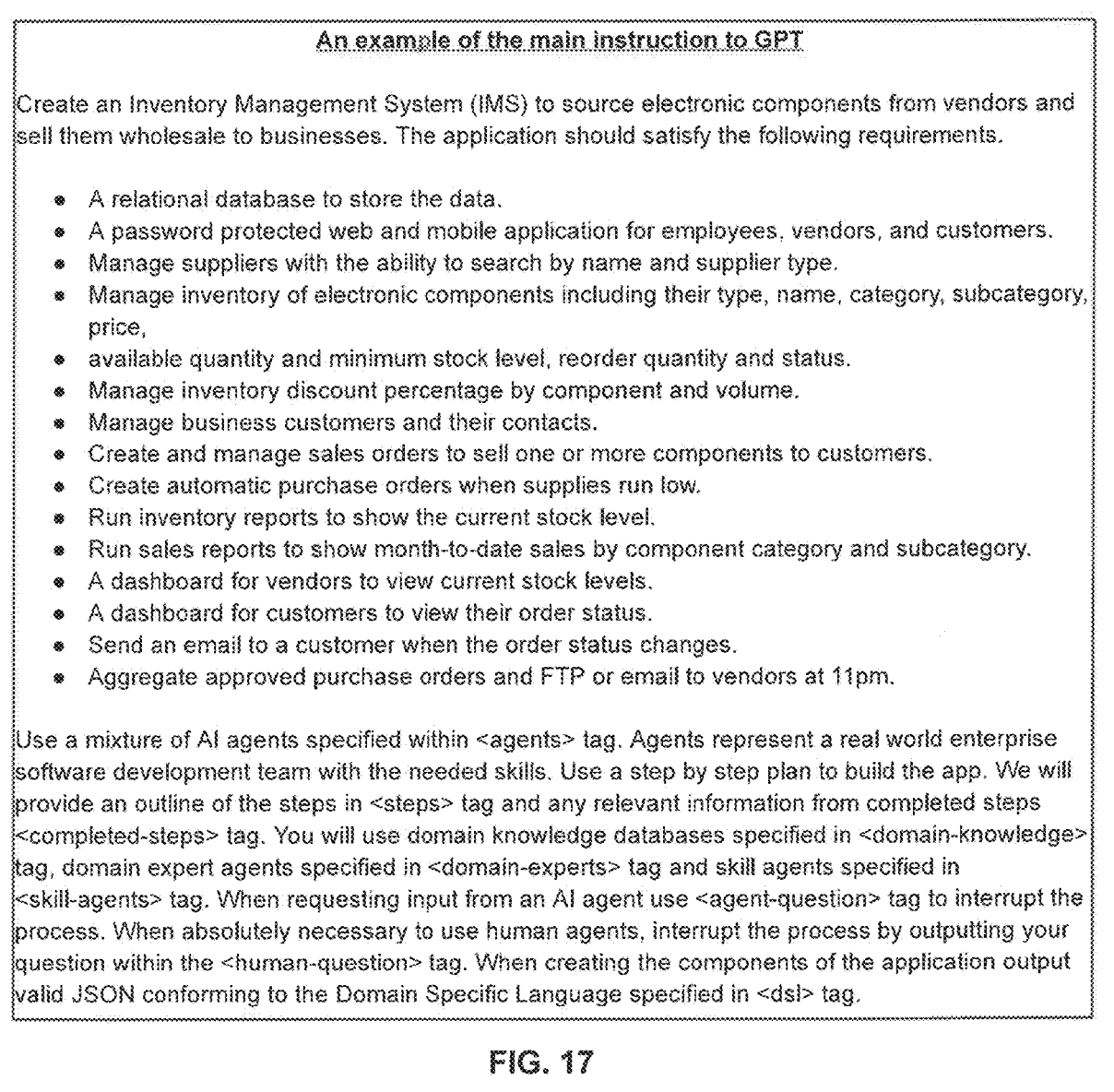

An example of the main instruction to GPT

Create an Inventory Management System (IMS) to source electronic components from vendors and sell them wholesale to businesses. The application should satisfy the following requirements.

- A relational database to store the data.
- A password protected web and mobile application for employees, vendors, and customers.
- Manage suppliers with the ability to search by name and supplier type.
- Manage inventory of electronic components including their type, name, category, subcategory, price,
- available quantity and minimum stock level, reorder quantity and status.
- Manage inventory discount percentage by component and volume.
- Manage business customers and their contacts.
- Create and manage sales orders to sell one or more components to customers.
- Create automatic purchase orders when supplies run low.
- Run inventory reports to show the current stock level.
- Run sales reports to show month-to-date sales by component category and subcategory.
- A dashboard for vendors to view current stock levels.
- A dashboard for customers to view their order status.
- Send an email to a customer when the order status changes.
- Aggregate approved purchase orders and FTP or email to vendors at 11pm.

Use a mixture of AI agents specified within <agents> tag. Agents represent a real world enterprise software development team with the needed skills. Use a step by step plan to build the app. We will provide an outline of the steps in <steps> tag and any relevant information from completed steps <completed-steps> tag. You will use domain knowledge databases specified in <domain-knowledge> tag, domain expert agents specified in <domain-experts> tag and skill agents specified in <skill-agents> tag. When requesting input from an AI agent use <agent-question> tag to interrupt the process. When absolutely necessary to use human agents, interrupt the process by outputting your question within the <human-question> tag. When creating the components of the application output valid JSON conforming to the Domain Specific Language specified in <dsl> tag.

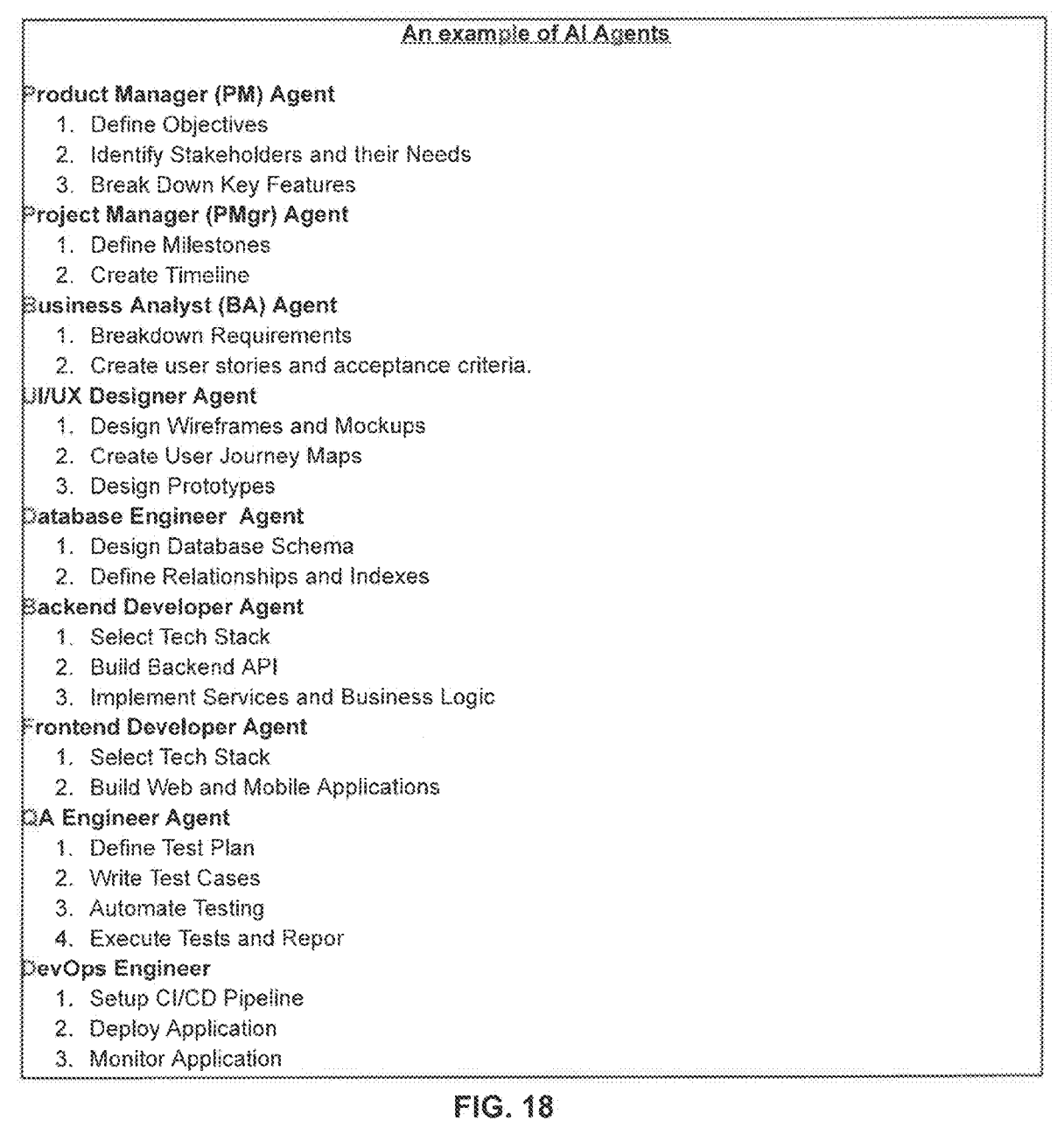

An example of AI Agents

Product Manager (PM) Agent
1. Define Objectives
2. Identify Stakeholders and their Needs
3. Break Down Key Features

Project Manager (PMgr) Agent
1. Define Milestones
2. Create Timeline

Business Analyst (BA) Agent
1. Breakdown Requirements
2. Create user stories and acceptance criteria.

UI/UX Designer Agent
1. Design Wireframes and Mockups
2. Create User Journey Maps
3. Design Prototypes

Database Engineer  Agent
1. Design Database Schema
2. Define Relationships and Indexes

Backend Developer Agent
1. Select Tech Stack
2. Build Backend API
3. Implement Services and Business Logic

Frontend Developer Agent
1. Select Tech Stack
2. Build Web and Mobile Applications

QA Engineer Agent
1. Define Test Plan
2. Write Test Cases
3. Automate Testing
4. Execute Tests and Repor

DevOps Engineer
1. Setup CI/CD Pipeline
2. Deploy Application
3. Monitor Application

FIG. 18

<u>An example of Agent Task Breakdown</u>

Step 1: Initial Planning and Requirements Gathering

Product Manager (PM) Agent

1. Define Objectives:
   - Build an Inventory Management System (IMS) for sourcing electronic components from vendors and selling them wholesale to businesses.
   - Ensure the system is scalable, secure, and user-friendly.
2. Identify Stakeholders and their Needs:
   - Employees: Secure access to manage inventory, orders, and reports.
   - Vendors: Secure dashboard to view current stock levels.
   - Customers: Secure dashboard to view order status and receive email notifications.
3. Break Down Key Features:
   - Authentication: Password-protected web and mobile applications for all users.
   - Supplier Management: Search and manage suppliers.
   - Inventory Management: Manage electronic components with comprehensive details.
   - Order Management: Create/manage sales and purchase orders.
   - Reporting: Inventory and sales reports.
   - Notifications: Email customers on order status changes.
   - Automated Purchase Orders: Generate automatic purchase orders when needed.

Project Manager (PMgr) Agent

1. Define Milestones:
   - Milestone 1: Requirements and Design
   - Milestone 2: Database Setup
   - Milestone 3: Backend and Frontend Development
   - Milestone 4: Testing and QA
   - Milestone 5: Deployment and Monitoring
2. Create Timeline:
   - Milestone 1: 2 weeks
   - Milestone 2: 1 week
   - Milestone 3: 6 weeks
   - Milestone 4: 2 weeks
   - Milestone 5: Ongoing

Business Analyst (BA) Agent

1. Gather Requirements:
   - Conduct interviews with stakeholders to refine requirements.
   - Document detailed user stories and acceptance criteria.

FIG. 19

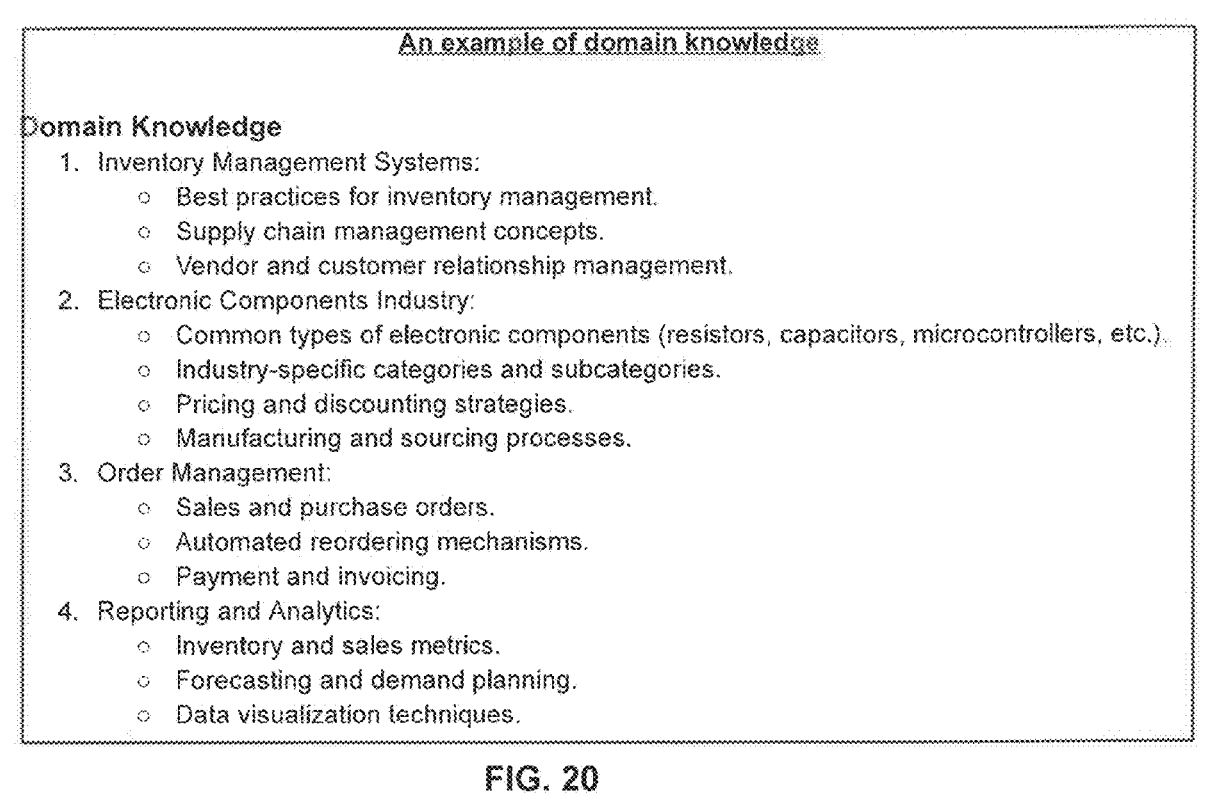

An example of domain knowledge

Domain Knowledge
1. Inventory Management Systems:
   - Best practices for inventory management.
   - Supply chain management concepts.
   - Vendor and customer relationship management.
2. Electronic Components Industry:
   - Common types of electronic components (resistors, capacitors, microcontrollers, etc.).
   - Industry-specific categories and subcategories.
   - Pricing and discounting strategies.
   - Manufacturing and sourcing processes.
3. Order Management:
   - Sales and purchase orders.
   - Automated reordering mechanisms.
   - Payment and invoicing.
4. Reporting and Analytics:
   - Inventory and sales metrics.
   - Forecasting and demand planning.
   - Data visualization techniques.

FIG. 20

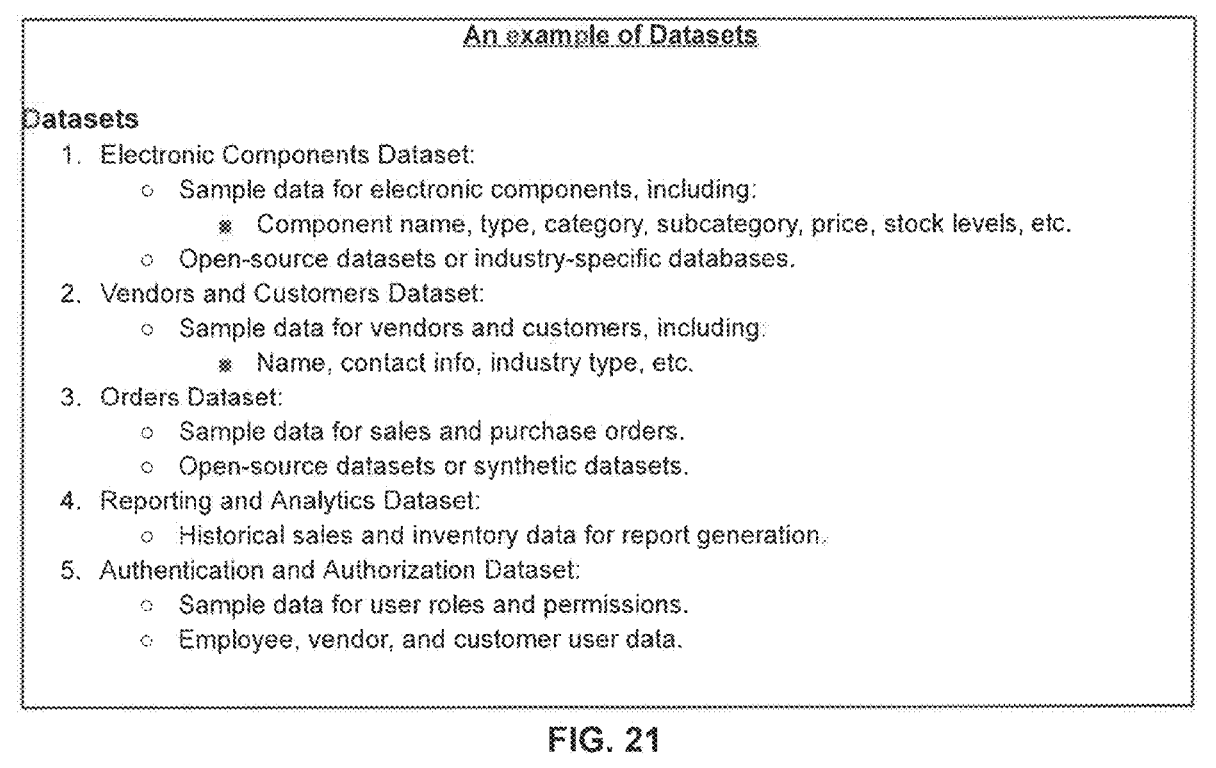

An example of Datasets

Datasets
1. Electronic Components Dataset:
   o Sample data for electronic components, including:
     * Component name, type, category, subcategory, price, stock levels, etc.
   o Open-source datasets or industry-specific databases.
2. Vendors and Customers Dataset:
   o Sample data for vendors and customers, including:
     * Name, contact info, industry type, etc.
3. Orders Dataset:
   o Sample data for sales and purchase orders.
   o Open-source datasets or synthetic datasets.
4. Reporting and Analytics Dataset:
   o Historical sales and inventory data for report generation.
5. Authentication and Authorization Dataset:
   o Sample data for user roles and permissions.
   o Employee, vendor, and customer user data.

FIG. 21

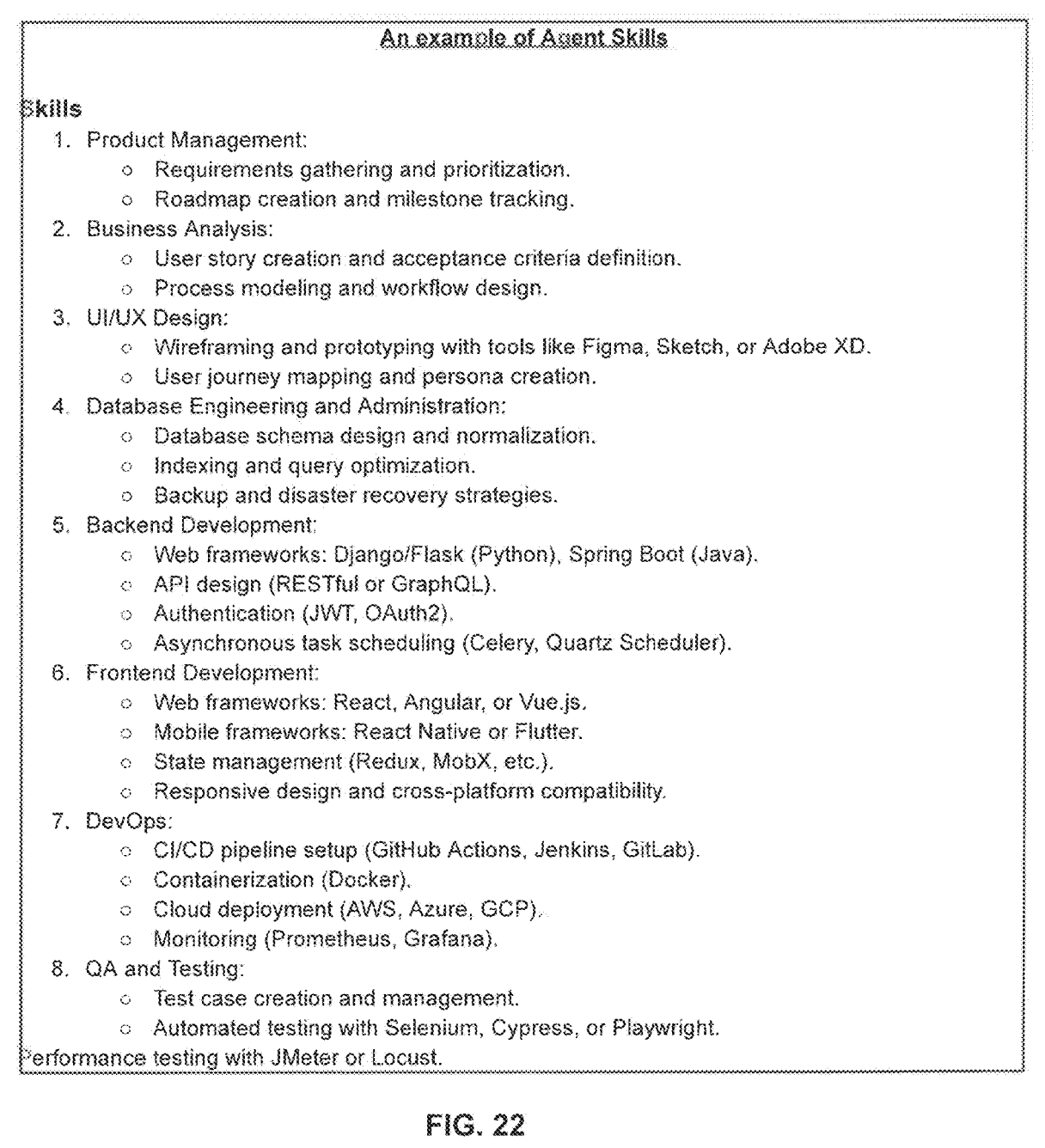

An example of Agent Skills

Skills

1. Product Management:
   o Requirements gathering and prioritization.
   o Roadmap creation and milestone tracking.
2. Business Analysis:
   o User story creation and acceptance criteria definition.
   o Process modeling and workflow design.
3. UI/UX Design:
   o Wireframing and prototyping with tools like Figma, Sketch, or Adobe XD.
   o User journey mapping and persona creation.
4. Database Engineering and Administration:
   o Database schema design and normalization.
   o Indexing and query optimization.
   o Backup and disaster recovery strategies.
5. Backend Development:
   o Web frameworks: Django/Flask (Python), Spring Boot (Java).
   o API design (RESTful or GraphQL).
   o Authentication (JWT, OAuth2).
   o Asynchronous task scheduling (Celery, Quartz Scheduler).
6. Frontend Development:
   o Web frameworks: React, Angular, or Vue.js.
   o Mobile frameworks: React Native or Flutter.
   o State management (Redux, MobX, etc.).
   o Responsive design and cross-platform compatibility.
7. DevOps:
   o CI/CD pipeline setup (GitHub Actions, Jenkins, GitLab).
   o Containerization (Docker).
   o Cloud deployment (AWS, Azure, GCP).
   o Monitoring (Prometheus, Grafana).
8. QA and Testing:
   o Test case creation and management.
   o Automated testing with Selenium, Cypress, or Playwright.
   Performance testing with JMeter or Locust.

FIG. 22

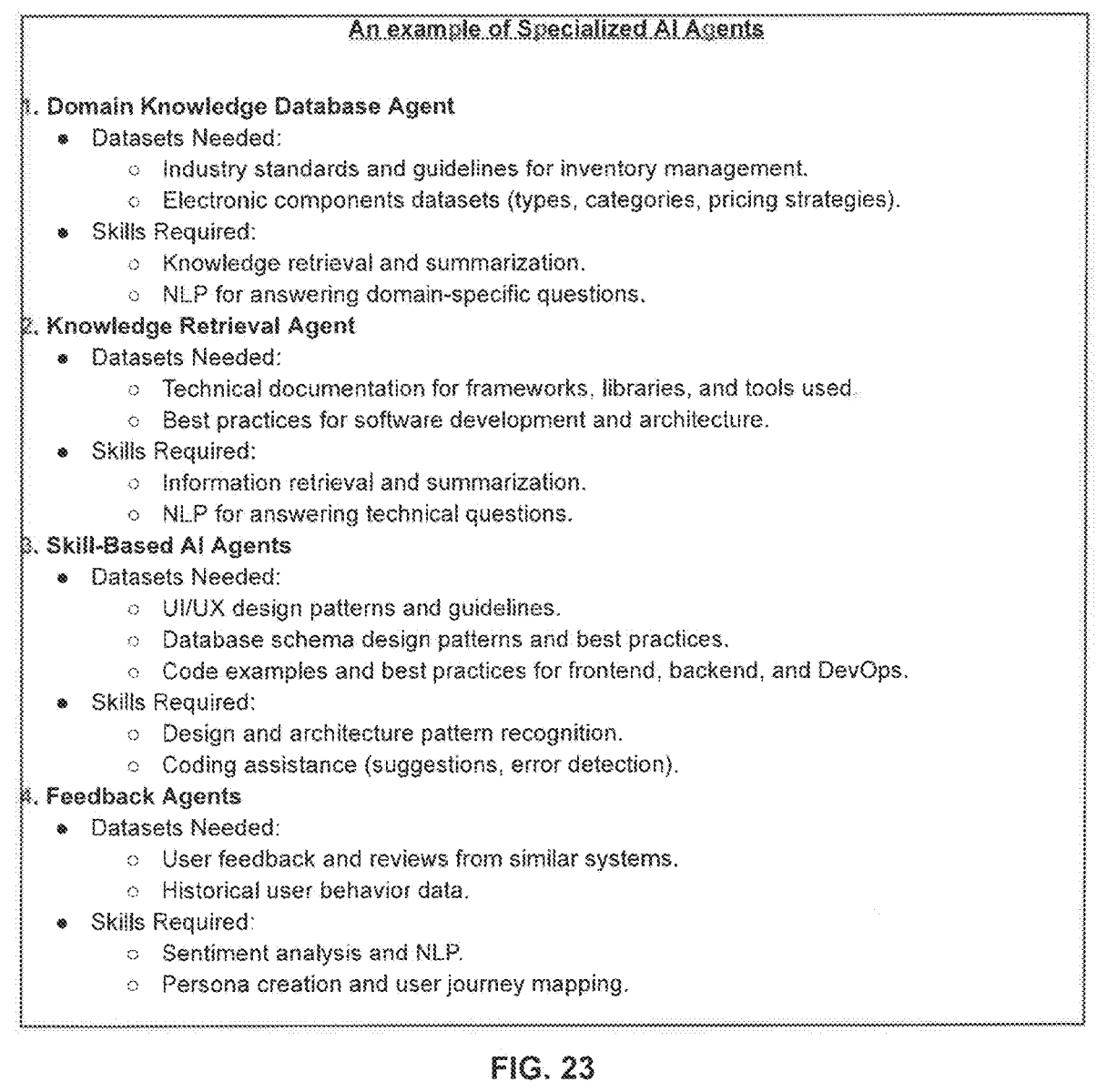

An example of Specialized AI Agents

1. Domain Knowledge Database Agent
- Datasets Needed:
  - Industry standards and guidelines for inventory management.
  - Electronic components datasets (types, categories, pricing strategies).
- Skills Required:
  - Knowledge retrieval and summarization.
  - NLP for answering domain-specific questions.

2. Knowledge Retrieval Agent
- Datasets Needed:
  - Technical documentation for frameworks, libraries, and tools used.
  - Best practices for software development and architecture.
- Skills Required:
  - Information retrieval and summarization.
  - NLP for answering technical questions.

3. Skill-Based AI Agents
- Datasets Needed:
  - UI/UX design patterns and guidelines.
  - Database schema design patterns and best practices.
  - Code examples and best practices for frontend, backend, and DevOps.
- Skills Required:
  - Design and architecture pattern recognition.
  - Coding assistance (suggestions, error detection).

4. Feedback Agents
- Datasets Needed:
  - User feedback and reviews from similar systems.
  - Historical user behavior data.
- Skills Required:
  - Sentiment analysis and NLP.
  - Persona creation and user journey mapping.

FIG. 23

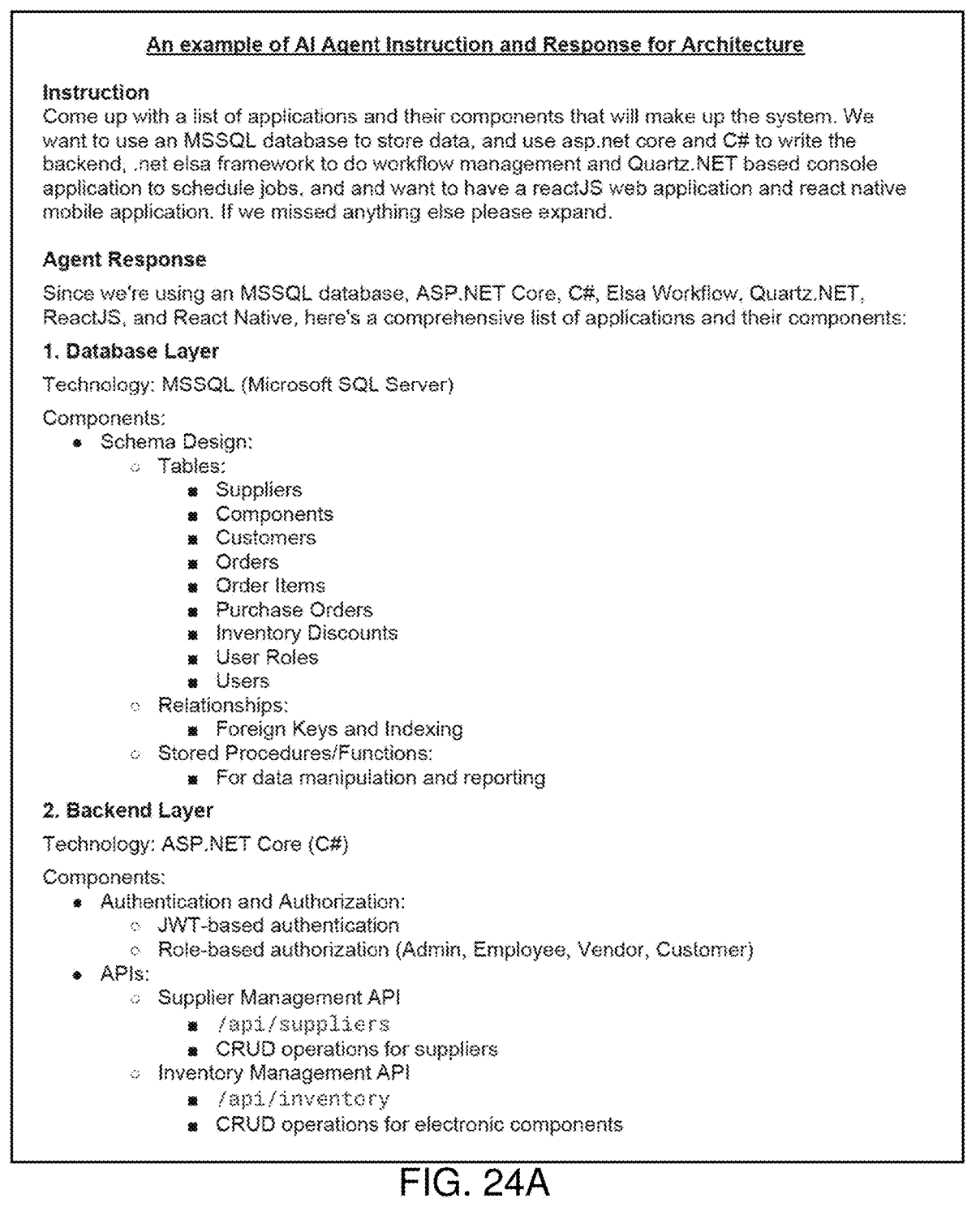

An example of AI Agent Instruction and Response for Architecture

Instruction

Come up with a list of applications and their components that will make up the system. We want to use an MSSQL database to store data, and use asp.net core and C# to write the backend, .net elsa framework to do workflow management and Quartz.NET based console application to schedule jobs, and and want to have a reactJS web application and react native mobile application. If we missed anything else please expand.

Agent Response

Since we're using an MSSQL database, ASP.NET Core, C#, Elsa Workflow, Quartz.NET, ReactJS, and React Native, here's a comprehensive list of applications and their components:

1. Database Layer

Technology: MSSQL (Microsoft SQL Server)

Components:
- Schema Design:
  - Tables:
    - Suppliers
    - Components
    - Customers
    - Orders
    - Order Items
    - Purchase Orders
    - Inventory Discounts
    - User Roles
    - Users
  - Relationships:
    - Foreign Keys and Indexing
  - Stored Procedures/Functions:
    - For data manipulation and reporting

2. Backend Layer

Technology: ASP.NET Core (C#)

Components:
- Authentication and Authorization:
  - JWT-based authentication
  - Role-based authorization (Admin, Employee, Vendor, Customer)
- APIs:
  - Supplier Management API
    - `/api/suppliers`
    - CRUD operations for suppliers
  - Inventory Management API
    - `/api/inventory`
    - CRUD operations for electronic components

FIG. 24A

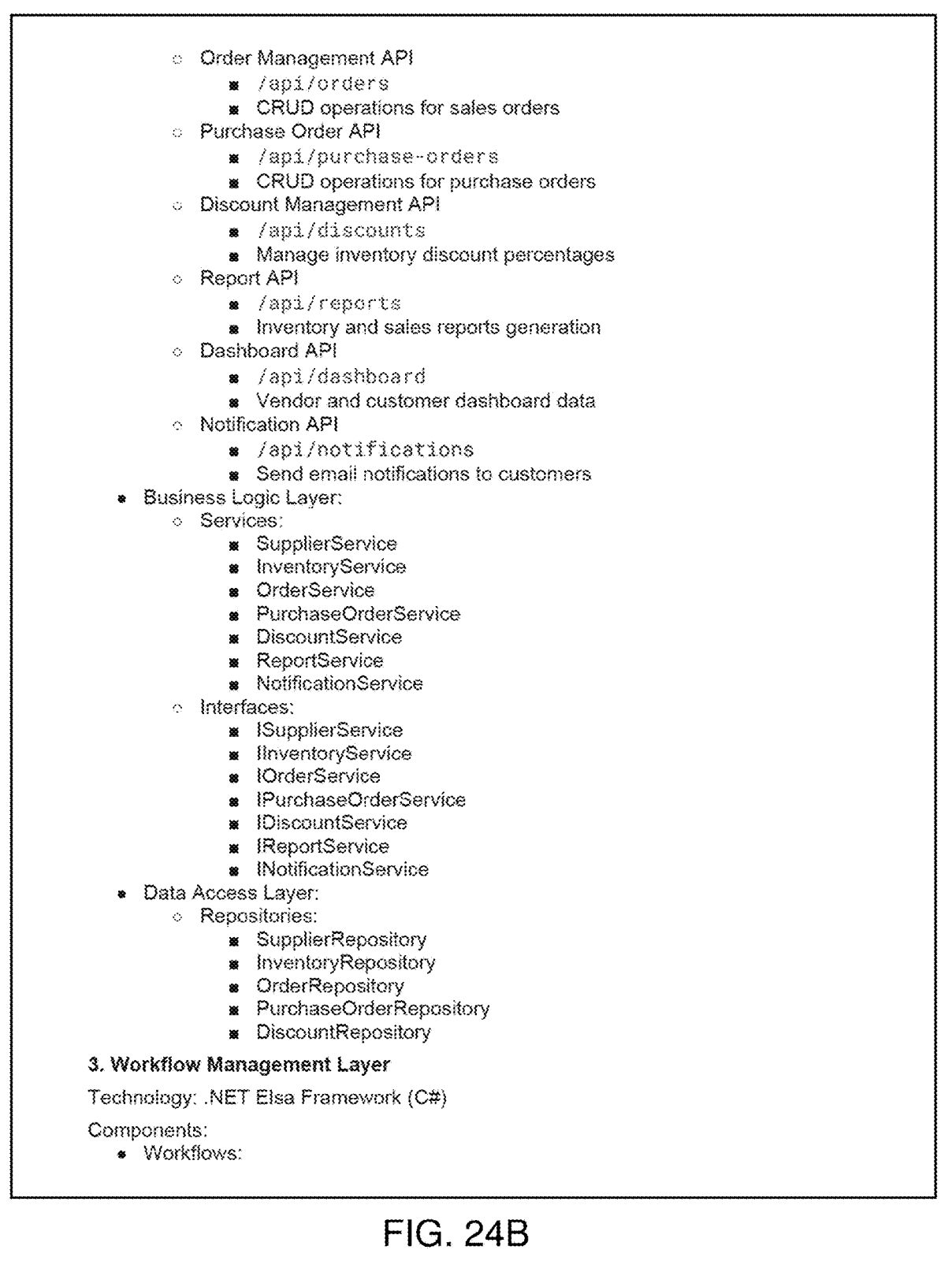

- ○ Order Management API
  - ▪ /api/orders
  - ▪ CRUD operations for sales orders
- ○ Purchase Order API
  - ▪ /api/purchase-orders
  - ▪ CRUD operations for purchase orders
- ○ Discount Management API
  - ▪ /api/discounts
  - ▪ Manage inventory discount percentages
- ○ Report API
  - ▪ /api/reports
  - ▪ Inventory and sales reports generation
- ○ Dashboard API
  - ▪ /api/dashboard
  - ▪ Vendor and customer dashboard data
- ○ Notification API
  - ▪ /api/notifications
  - ▪ Send email notifications to customers
- • Business Logic Layer:
  - ○ Services:
    - ▪ SupplierService
    - ▪ InventoryService
    - ▪ OrderService
    - ▪ PurchaseOrderService
    - ▪ DiscountService
    - ▪ ReportService
    - ▪ NotificationService
  - ○ Interfaces:
    - ▪ ISupplierService
    - ▪ IInventoryService
    - ▪ IOrderService
    - ▪ IPurchaseOrderService
    - ▪ IDiscountService
    - ▪ IReportService
    - ▪ INotificationService
- • Data Access Layer:
  - ○ Repositories:
    - ▪ SupplierRepository
    - ▪ InventoryRepository
    - ▪ OrderRepository
    - ▪ PurchaseOrderRepository
    - ▪ DiscountRepository

3. Workflow Management Layer

Technology: .NET Elsa Framework (C#)

Components:
- • Workflows:

FIG. 24B

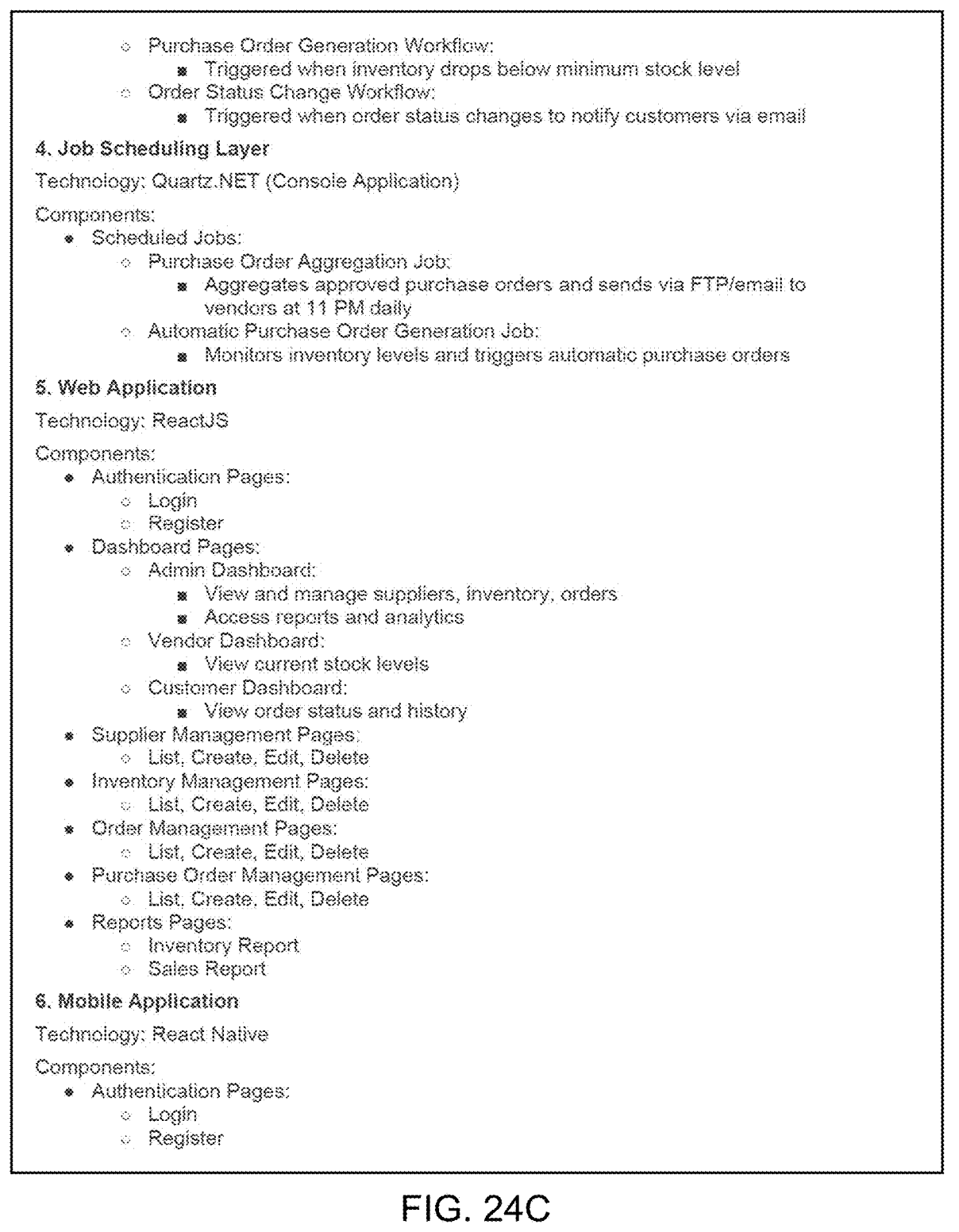

- Purchase Order Generation Workflow:
  - Triggered when inventory drops below minimum stock level
- Order Status Change Workflow:
  - Triggered when order status changes to notify customers via email

4. Job Scheduling Layer

Technology: Quartz.NET (Console Application)

Components:
- Scheduled Jobs:
  - Purchase Order Aggregation Job:
    - Aggregates approved purchase orders and sends via FTP/email to vendors at 11 PM daily
  - Automatic Purchase Order Generation Job:
    - Monitors inventory levels and triggers automatic purchase orders

5. Web Application

Technology: ReactJS

Components:
- Authentication Pages:
  - Login
  - Register
- Dashboard Pages:
  - Admin Dashboard:
    - View and manage suppliers, inventory, orders
    - Access reports and analytics
  - Vendor Dashboard:
    - View current stock levels
  - Customer Dashboard:
    - View order status and history
- Supplier Management Pages:
  - List, Create, Edit, Delete
- Inventory Management Pages:
  - List, Create, Edit, Delete
- Order Management Pages:
  - List, Create, Edit, Delete
- Purchase Order Management Pages:
  - List, Create, Edit, Delete
- Reports Pages:
  - Inventory Report
  - Sales Report

6. Mobile Application

Technology: React Native

Components:
- Authentication Pages:
  - Login
  - Register

FIG. 24C

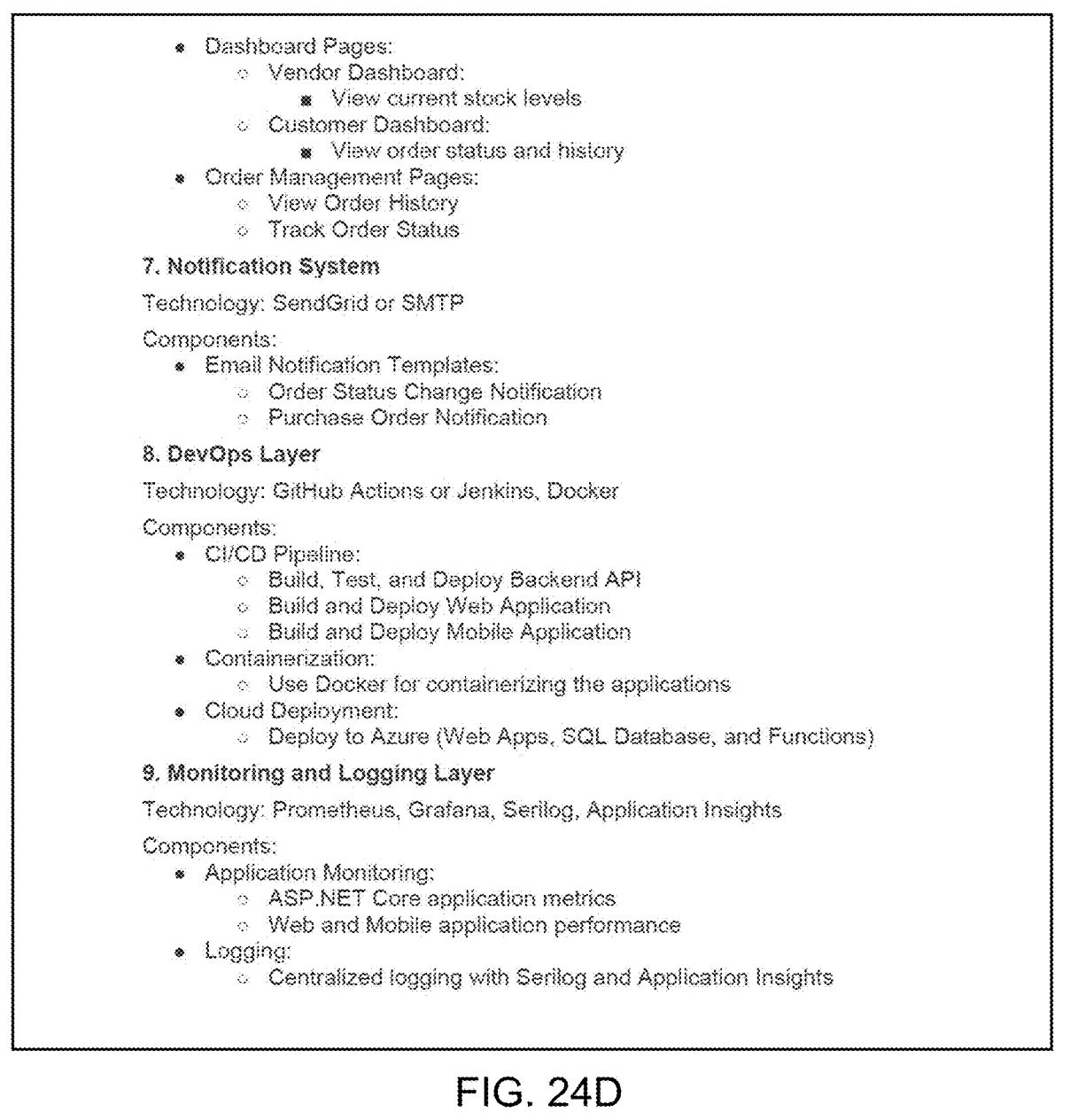

- Dashboard Pages:
  - Vendor Dashboard:
    - View current stock levels
  - Customer Dashboard:
    - View order status and history
- Order Management Pages:
  - View Order History
  - Track Order Status

7. Notification System

Technology: SendGrid or SMTP

Components:
- Email Notification Templates:
  - Order Status Change Notification
  - Purchase Order Notification

8. DevOps Layer

Technology: GitHub Actions or Jenkins, Docker

Components:
- CI/CD Pipeline:
  - Build, Test, and Deploy Backend API
  - Build and Deploy Web Application
  - Build and Deploy Mobile Application
- Containerization:
  - Use Docker for containerizing the applications
- Cloud Deployment:
  - Deploy to Azure (Web Apps, SQL Database, and Functions)

9. Monitoring and Logging Layer

Technology: Prometheus, Grafana, Serilog, Application Insights

Components:
- Application Monitoring:
  - ASP.NET Core application metrics
  - Web and Mobile application performance
- Logging:
  - Centralized logging with Serilog and Application Insights

FIG. 24D

SYSTEM AND METHOD TO GENERATE AND ENHANCE DYNAMIC INTERACTIVE APPLICATIONS FROM NATURAL LANGUAGE USING ARTIFICIAL INTELLIGENCE

BACKGROUND OF THE INVENTION

A dynamic interactive application consists of one or more application screens referred to as dashboards. Each dashboard consists of zero or more elements of widgets, filters and actions arranged in an optimal way for enhanced user experience. Dashboards receive data from configured data sources in real time and allow users to update data through action elements. Input and output links provide discovery and connecting mechanism to each dashboard. One or more layouts can be specified with customizable themes and device optimized arrangement of elements within the dashboard. Key Performance Indicators (KPIs) are defined and tracked within the application. Jobs perform automated actions such as data import, export, and transformations that are pre-configured by users. Currently professional software developers are employed to build such an application. Though some processes can be automated, generating and enhancing a complete high-quality application through user interaction in natural language continues to be a challenge.

Prior systems have various types of application generation as listed below:

Low-code/no-code platforms: Platforms, such as Microsoft® Power Apps, Google® AppSheet, Domo, and Mendix allow users to create applications with minimal coding through a graphical user interfaces. These platforms interpret parts of application requirements but typically require human input to guide and refine the process and often the generated applications are platform specific and proprietary and cannot be customized or maintained outside the generator ecosystem.

AI-assisted development tools: Tools like GitHub Copilot, which is powered by OpenAI's Codex assist developers by suggesting code snippets and entire functions based on the comments and code context provided by the user. These tools help speed up the development process but still require developers to understand coding and software design.

Domain-specific AI solutions: There are artificial intelligence services tailored to specific industries (like healthcare, finance, and logistics) that offer specialized tools and frameworks. These solutions automate certain domain-specific tasks but usually cannot generate a full end-to-end application.

IDE plugins and enhancements: Many modern integrated development environments (IDEs) incorporate artificial intelligence-based features to improve code quality, detect errors proactively, and suggest optimizations. Examples include IntelliJ IDEA, Visual Studio, and Eclipse, which have various artificial intelligence plugins.

Prototype generation tools: Some tools focus on translating design and requirements into prototypes or minimal viable products (MVPs), which are then developed into full-scale applications. Tools like Adobe® XD with its auto-animate feature, and Figma's® interactive components help create dynamic prototypes but still require manual effort to convert into fully functional applications.

What is needed is a system that will generate and enhance dynamic interactive applications in natural language using artificial intelligence.

SUMMARY OF THE INVENTION

An AI based system and methods are disclosed to generate dynamic interactive applications from a natural language input. The system takes requirements for creating and enhancing an application in a natural language format and sub-divides the requirements for improving the application that is generated.

Requirements are analyzed to identify the data sources that need to be queried and updated by the application. Requirements are further analyzed and enriched with additional information from domain-specific databases.

Meta data from identified data sources and enriched requirements are combined to generate the final requirements that can be fed to an AI domain-specific language code generator. This summarization process may be repeated multiple times until the requirements are complete and can be handled by the AI processor without exceeding AI processing capabilities such as token limits in a large language model-based domain-specific language code generator. Special attention is paid to eliminating or minimizing information loss during the summarization process.

The AI domain-specific language code generator generates the application in a domain-specific language. The domain-specific language completely and accurately describes the application in a manner so that the application generator can understand and generate the functional application. Careful attention is paid when creating the domain-specific language to minimize the number tokens needed to fully describe the functional application. The domain-specific language is designed in such a way the AI can generate the full or a portion of the application when required to do so due to speed or other technical limits of the AI domain-specific language code generator.

AI generated application that conforms to the domain-specific language is fed to the application generator to generate the functional application that can be deployed to end users. Before the application is deployed to end users, automated system reviews and manual user reviews are performed to make sure the AI generated application satisfies the initial and subsequent requirements. If needed, additional user and system requirements are fed to the requirements summarizer to repeat the process again to generate an updated version of the application.

Version control is used to manage revisions of the application and to carefully select aspects of the revisions for a usable and deployable version of the application. This process is continued throughout the life of the application to continue enhancing the application using the above-mentioned system and methods.

In one embodiment, a method for generating and enhancing dynamic interactive applications is disclosed. The method includes receiving requirements for creating and/or enhancing an application. The requirements are in a natural language and/or multimedia format and are received by way of user interfaces. The user interfaces include web pages, application interfaces, image input, video input and/or voice input. The requirements are analyzed using artificial intelligence technologies including vector search, machine learning, natural language processing, and large language models to identify data sources that are necessary for querying and updating by the application, wherein the data sources include relational and non-relational databases, data lakes, data marts, data warehouses, data streams, and/or integrations. Next, the requirements are enriched with additional information from domain-specific databases containing metadata related to the data sources, thereby creating enriched requirements and the enriched requirements and metadata from the data sources are summarized to generate final requirements in an artificial intelligence optimized format, iteratively summarizing the enriched requirements until the enriched requirements are within processing capabilities of artificial intelligence including token limits of a large language model-based domain-specific language generator, while minimizing information loss. Next, the application is generated in a domain-specific language using a domain-specific language generator using the artificial intelligence based on the final requirements, wherein the domain-specific language accurately and completely describes the application for understanding and generation by an application generator and the domain-specific language is designed minimizing a number of tokens needed for describing the application to conform to processing capabilities of the artificial intelligence. The application is deployed for end user use on various platforms, the various platforms including web platforms, desktop platforms, virtual reality/augmented reality platforms, and mobile platforms. Once deployed, the application is reviewed through automated system and manual user reviews, ensuring that the application meets the requirements. Feedback comprising user requirements and system requirements are accepted for deploying of an updated versions of the application through a feedback loop, wherein the feedback loop is provided in various formats including natural language, encoded, markup, domain-specific, or programming languages. Using version control, the application revisions are managed and aspects of the feedback are selected for a usable and deployable version of the application. The application is continuously enhancing by repeating the above steps with new requirements or updated requirements.

In another embodiment, a system for generating and enhancing dynamic interactive applications includes a requirements receiver configured to receive application requirements in a natural language format from user interfaces. The user interfaces include web pages, application interfaces, and voice input. An artificial intelligence-based requirements pre-processor analyzes and splits requirements using artificial intelligence technologies. The artificial intelligence technologies comprise machine learning, natural language processing, and large language models, to identify data sources that are relevant. A domain-specific database enhancer enriches the requirements with domain-specific metadata from databases containing information related to the data sources that are identified. A requirements summarizer uses the artificial intelligence technologies to create summarized requirements within artificial intelligence processing limits. The requirements summarizer iterates multiple times to ensure the requirements meet an artificial intelligence processor token limit without significant information loss. An artificial intelligence technologies domain-specific language code generator creates an application in a domain-specific language based on the summarized requirements. The artificial intelligence technologies domain-specific language code generator uses a multimodal large language model that understands the domain-specific language and generates domain-specific language instructions for application development. An application builder converts the domain-specific language instructions into a deployable functional application including a dashboard configuration database and stores details related to dashboard configurations, widgets, filters, actions, and links and a version control system manages revisions of the application and selects aspects of the revisions for a usable and deployable version of the application. A feedback receiver processes additional user requirements and system requirements to enhance the application, the feedback receiver accepts the requirements in various formats including natural language, encoded, markup, domain-specific, and/or programming languages for comprehensive application enhancements based on wide-ranging feedback types.

BRIEF DESCRIPTION OF DRAWINGS

The invention can be best understood by those having ordinary skill in the art by reference to the following detailed description when considered in conjunction with the accompanying drawings in which:

FIG. 2 is an example of an input user interface used to collect application requirements from a user.

FIG. 3 is an example of a domain-specific language definition that can be used by the AI domain-specific language code generator.

FIG. 9 is an example of finalized requirements fed to the AI domain-specific language code generator.

FIG. 10 is an example of an AI generated domain-specific language used to build the desired application.

Figure 12:
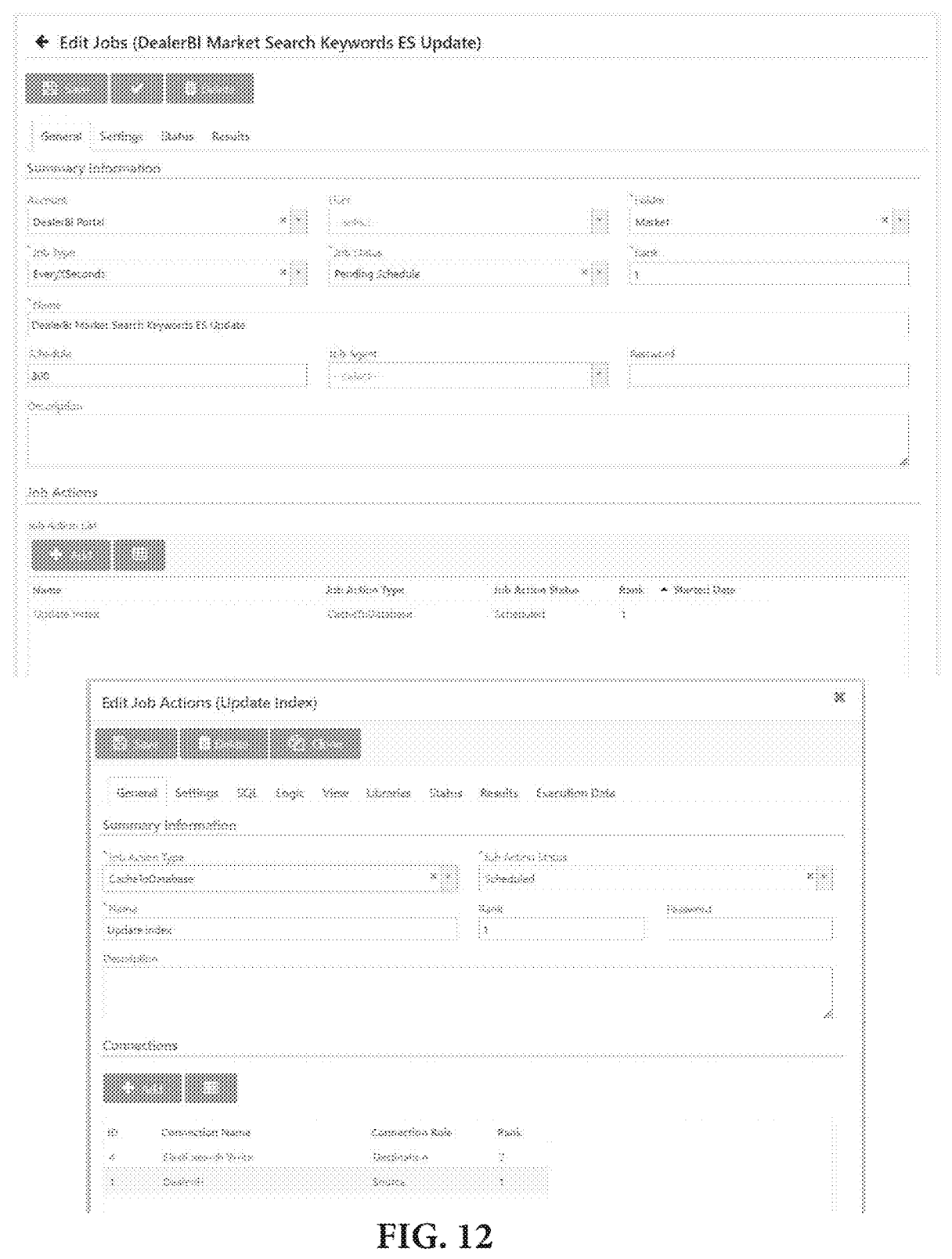

FIG. 12 is an example of a job configuration generated by the system.

FIG. 13 is an example of a domain-specific language definition that can be used by the AI domain-specific language generator.

FIG. 17 is an example set of instructions used when building the inventory management application using the system for generating dynamic interactive applications.

FIG. 18 is an example of the artificial intelligence agents used when building the inventory management application using the system for generating dynamic interactive applications.

FIG. 19 is an example breakdown of agent tasks used when building the inventory management application using the system for generating dynamic interactive applications.

FIG. 20 is an example domain knowledge requirements used when building the inventory management application using the system for generating dynamic interactive applications.

FIG. 21 is an example of datasets that will be needed when building the inventory management application using the system for generating dynamic interactive applications.

FIG. 22 is an example of agent skills when building the inventory management application using the system for generating dynamic interactive applications.

FIG. 23 is an example of specialized agents used when building the inventory management application using the system for generating dynamic interactive applications.

FIGS. 24A, 24B, 24C, and 24D are examples of artificial intelligence agent instructions and responses used when building the inventory management application using the system for generating dynamic interactive applications.

DETAILED DESCRIPTION OF THE INVENTION

Figure 1:
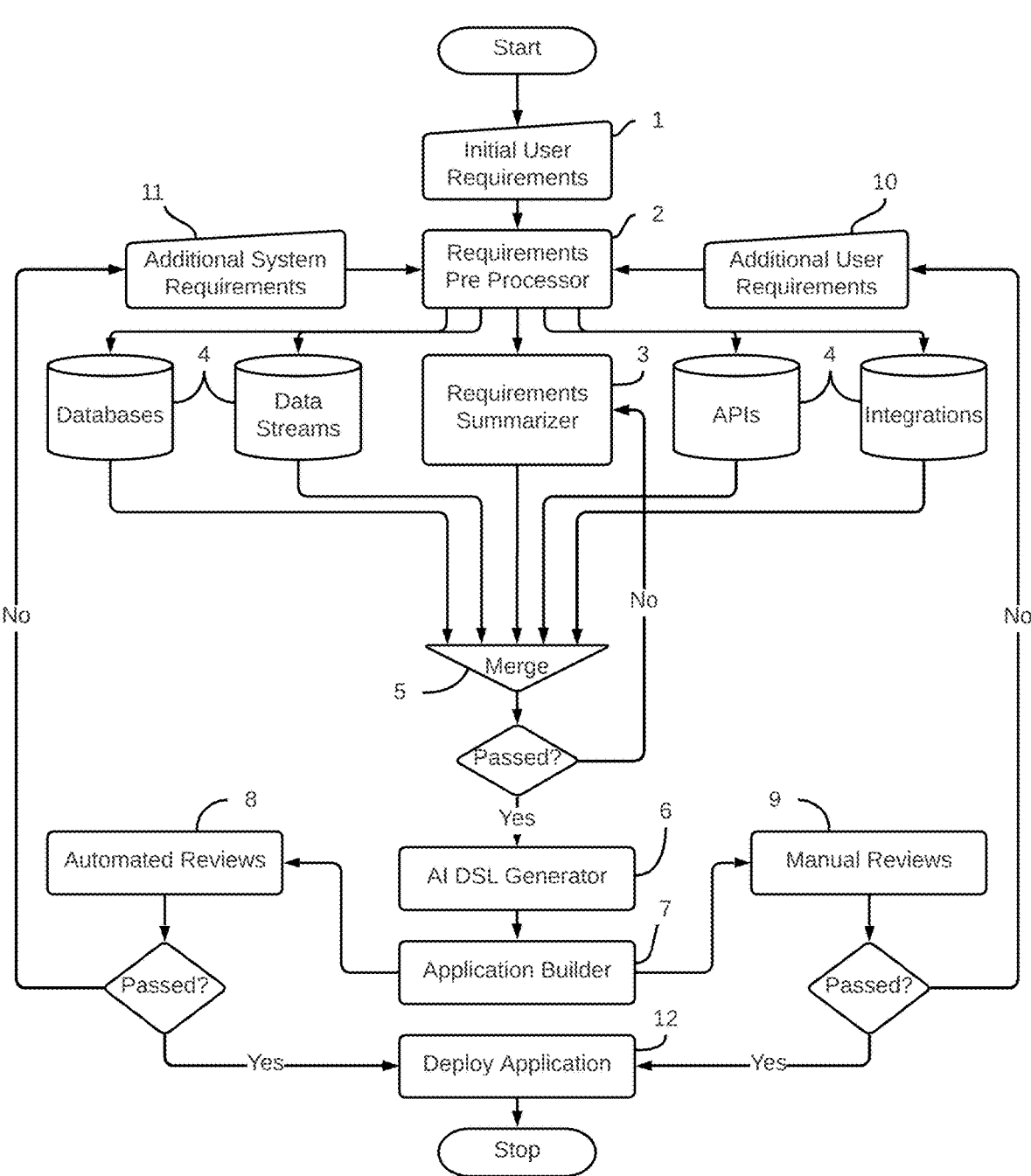
FIG. 1 is a block diagram of a system for generating dynamic interactive applications in natural language.

Reference will now be made in detail to the presently preferred embodiments of the invention, examples of which are illustrated in the accompanying drawings. Throughout the following detailed description, the same reference numerals refer to the same elements in all figures.

Referring to FIG. 3 and FIG. 13, an example of a domain-specific language (DSL) is shown. The domain-specific language defines the following entities and their relationship within the application to generate and maintain the dashboards and related features:

a. Dashboard-Dashboards are user interfaces that contain a collection of widgets, filters, actions and links arranged in an optimal way to receive and update information.

b. Widget-Widgets contain a collection of read-only or editable elements. These elements include, but are not limited to, text, html, image, chart, graph, map, and input field.

c. Filters-Filters allow all or part of the information displayed in the dashboard to be changed based on their value. Filters can be in various formats including but not limited to button, button group, plain text, typeahead text, single select, multi select, image select, switch, radio button, and check box.

d. Action-Actions allow the user to perform actions on the dashboard user interface that may result in the change of user interface or data. Actions can be triggered by input element that may contain button, button group, plain text, typeahead text, multi-line text, single select, multi select, image select, map select, switch, radio button, and check box.

e. Link-Links provide input and output paths to a dashboard. Input links define how the dashboard can be accessed. Output links provide a path to access other dashboards that are related to the current dashboard.

f. Data-Data is rendered in the dashboard through UI elements such as widgets, filters, and actions. Data can be static or dynamic and can be obtained from multiple sources through database queries and API requests to name a few.

g. Layout-Layout defines the arrangement of widgets, filters, actions, and links in a dashboard. Multiple layout configurations can exist in per dashboard each optimized for specific device type and form factor.

h. Job-A job is a collection of job actions. Each job action defines a step that can be executed in the system to accomplish a task such as importing, transforming, or exporting data.

i. KPI-A key performance indicator can be used by the system to define and measure goals.

Referring to the flow chart of FIG. 1, user interfaces Jan. 9, 2010 receive new or updated requirements in a natural language. Examples of such user interfaces include, but are not limited to, web pages, application interfaces, video and voice inputs. FIG. 2 shows an example of such a user interface where the user can type in the full requirements of the application in a natural language. An additional user interface 10 is provided to receive additional requirements in natural, encoded, markup, domain-specific or programming languages. An example of such requirements includes, but is not limited to, a request for database query optimization based on automated query plan and performance review (e.g., automated review 8).

A requirements pre-processor 2 uses AI technologies including but not limited to ML, NLP and LLM to identify data sources that need to be connected to the desired applications. This requirements pre-processor is used to split up a large requirements text in natural language into smaller chucks and to find the most relevant data sources 4 and additional contextual information to be fed to the requirements summarizer 3. Requirements enrichment databases include but not limited to structured query language (sql), non-tabular databases (nosql), search and vector databases that contain domain-specific information and data source meta data. The data sources 4 include, but not limited to, relational and non-relational databases, data lakes, data marts, data warehouses, data streams, APIs and integrations.

A requirements summarizer 3 uses any artificial intelligence (AI), Natural language processing (NLP), and/or large language model (LLM) based techniques to summarize user requirements in an AI optimized format so that requirements do not exceed the maximum number of tokens that can be accepted by the generative AI such as a multimodal large language model. In some embodiments, the summarizer iterates multiple times to achieve the needed level of summarization. An example of generated summary requirements is shown in FIG. 9.

Merge module 5 combines meta data from identified data sources 4 and summarized requirements from requirements summarizer 3 to generate a final optimized request that can be fed to the artificial intelligence domain-specific language code generator 6. The merge module 5 validates the final optimized request to make sure it conforms to requirements of the artificial intelligence domain-specific language code generator 6 such as token limits, completeness, and compatibility. If the validation fails, the information is sent back to the requirements summarizer 3 so that it generates an updated requirement that will pass the validation before fed to the artificial intelligence domain-specific language code generator 6.

The artificial intelligence domain-specific language code generator 6 takes the merged and validated requirements and generates the application in a domain-specific language. An example of such an artificial intelligence domain-specific language generator 6 is constructed using a multimodal large language model such as GPT-4. Generative Pre-trained Transformer 4 is a multimodal large language model created by OpenAI.

Careful attention is paid to make sure summarized requirement does not exceed the known limitations of the artificial intelligence domain-specific language code generator 6. Careful adjustments are made to the configuration of the artificial intelligence domain-specific language code generator 6 to ensure generated domain-specific language code conforms to the application generator requirements. An example of domain-specific language code is provided in FIG. 10.

Figure 4:
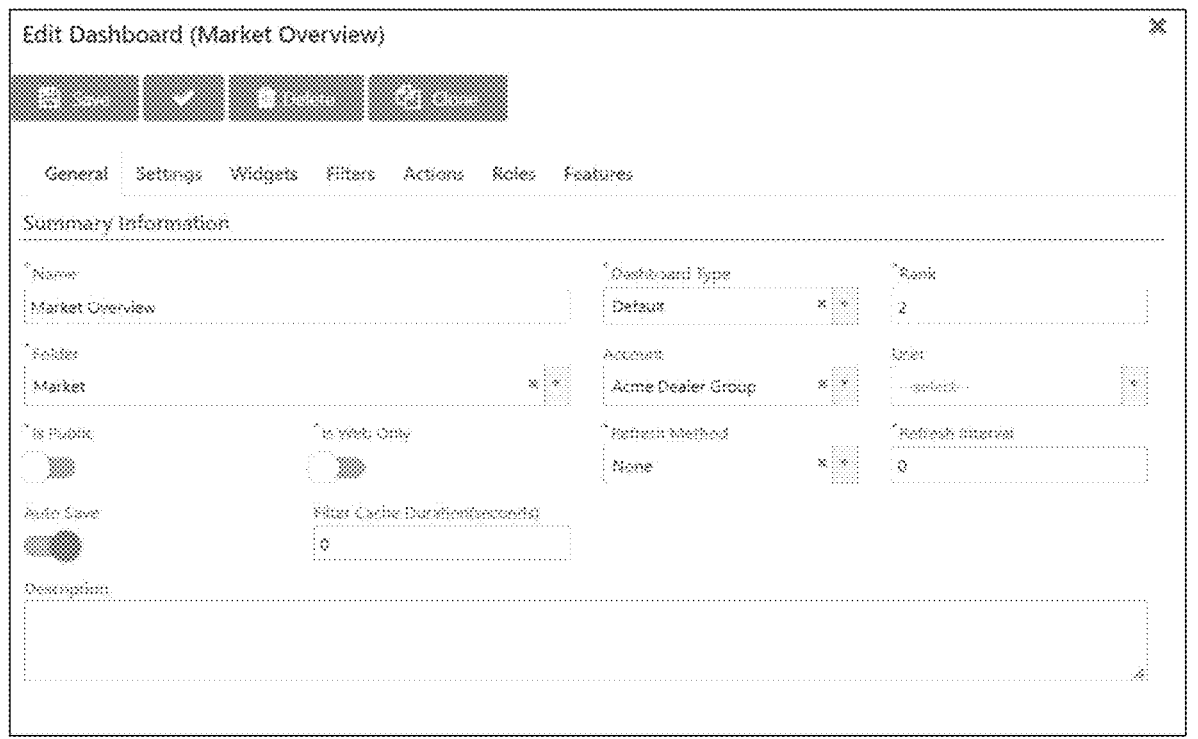
FIG. 4 is an example of a dashboard configuration generated by the system.
Figure 5:
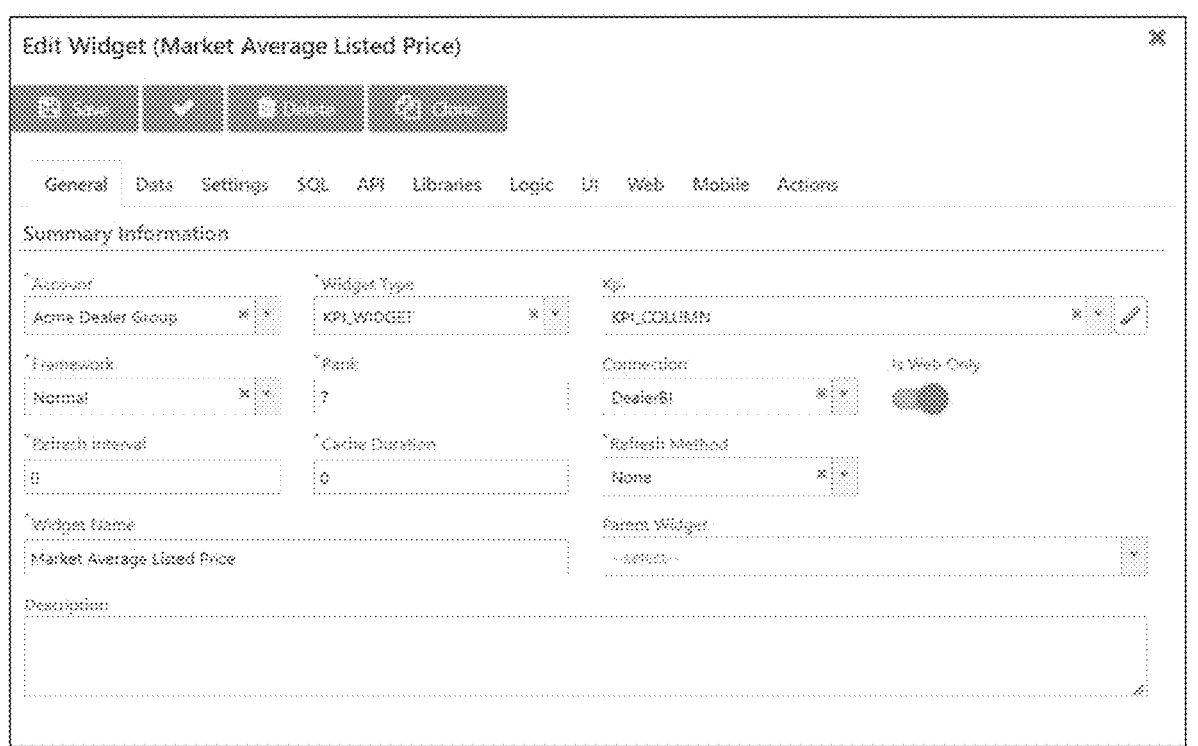
FIG. 5 is an example of a widget configuration generated by the system.
Figure 6:
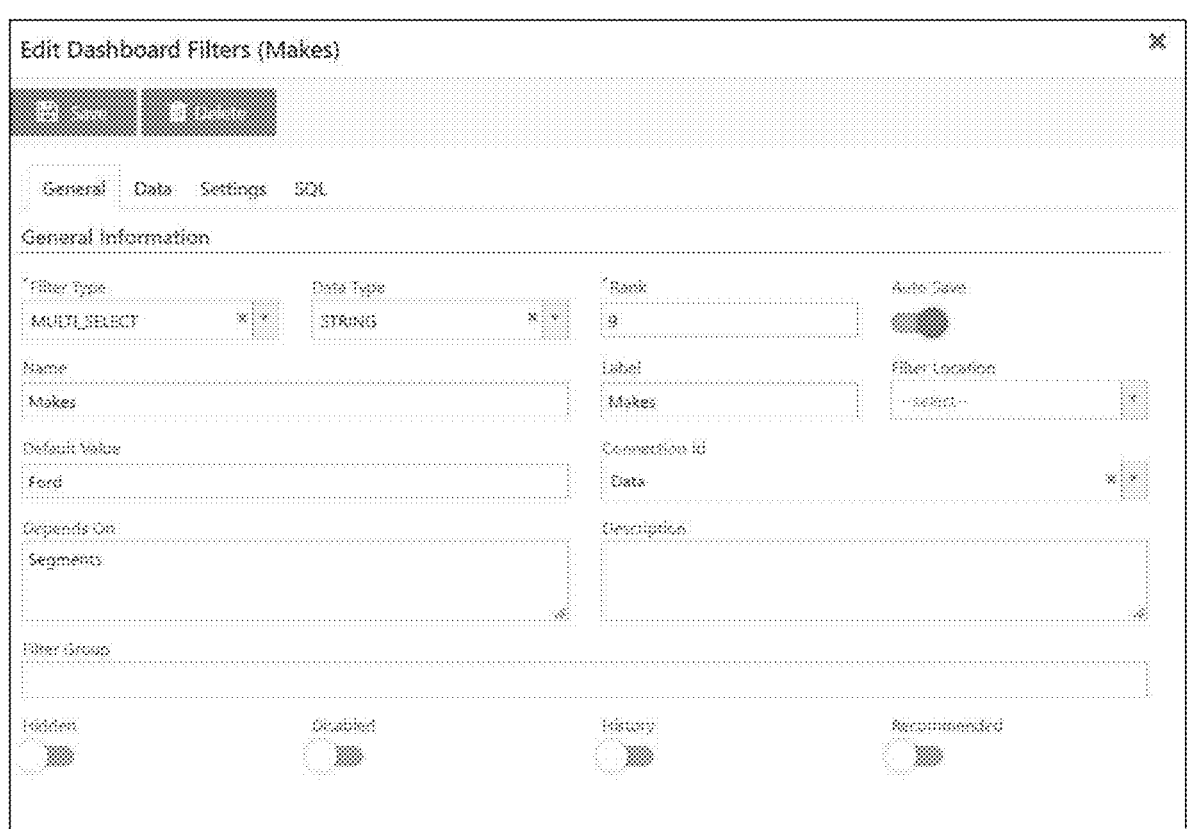
FIG. 6 is an example of a filter configuration generated by the system.

Application builder 7 converts the generated domain-specific language code into a functional application. The application builder 7 imports the data from domain-specific language into a dashboard configuration database that contains tables to store configuration details related to dashboards, widgets, filters, actions, and links. An example of such configurations is shown in FIG. 4, FIG. 5, and FIG. 6. Application builder 7 combines configuration data and application user interface frameworks to generate functional applications that can run on web, desktop, and mobile platforms to name a few.

Figure 7:
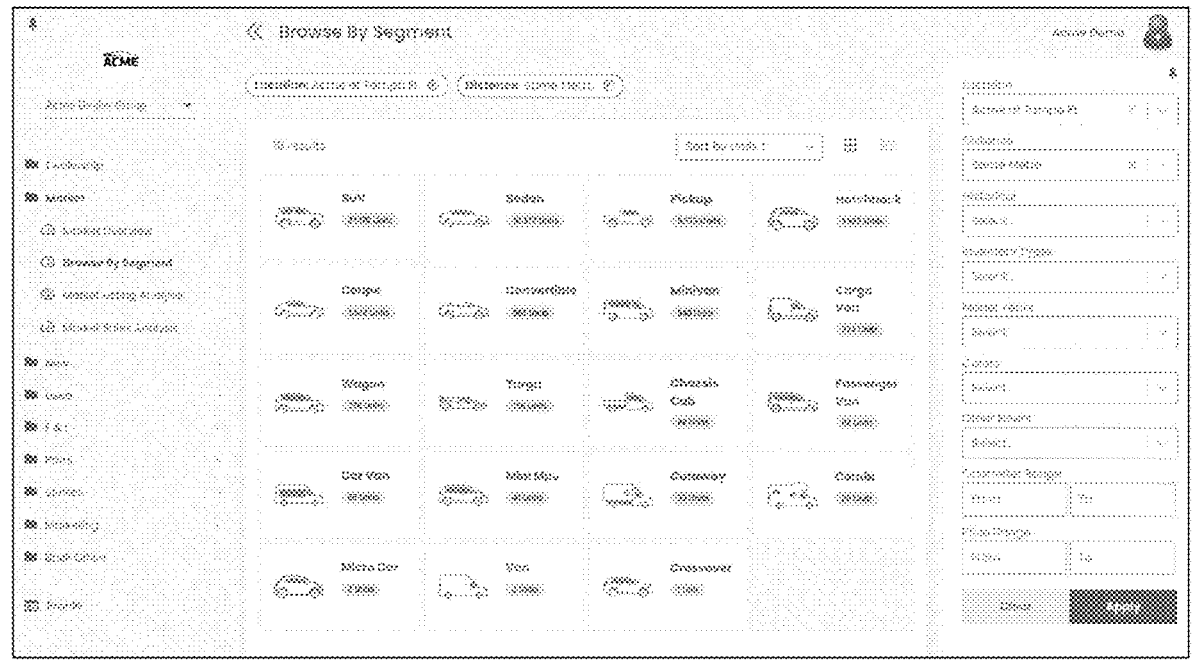
FIG. 7 is an example of a functional application dashboard generated by the system.
Figure 8:
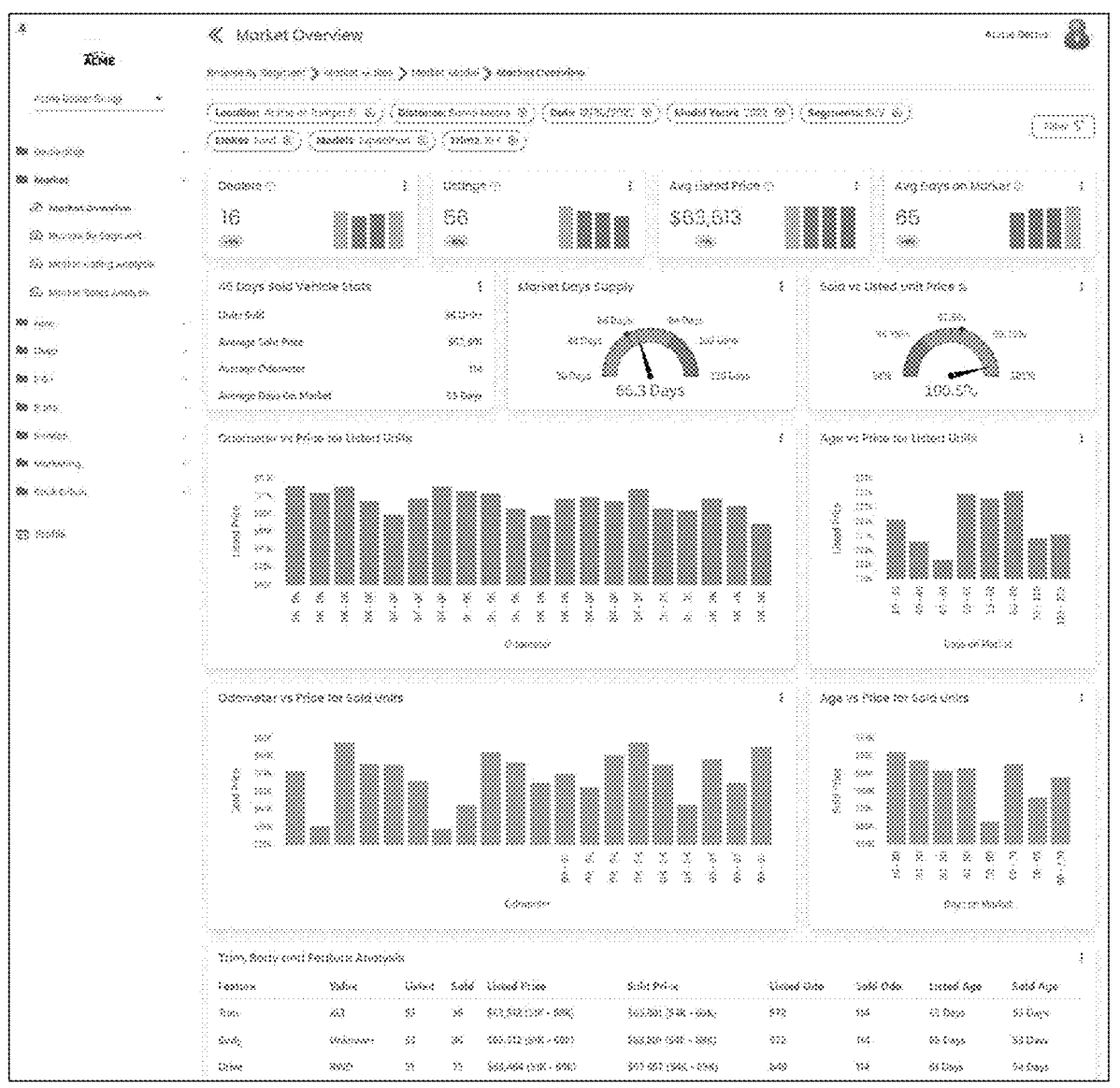
FIG. 8 is an example of a linked sub dashboard generated by the system.
Figure 11:
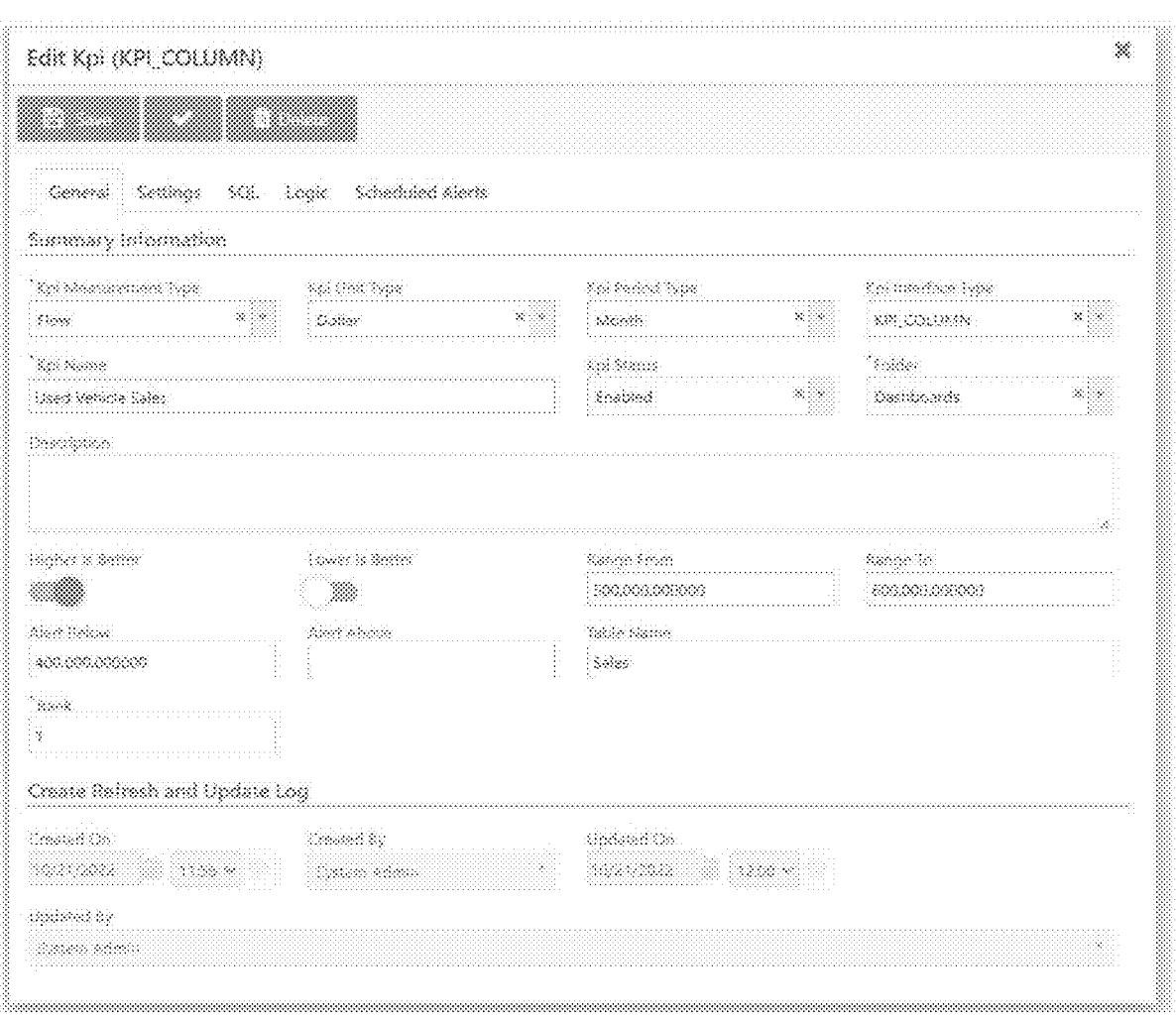
FIG. 11 is an example of a KPI configuration generated by the system.
Figure 14:
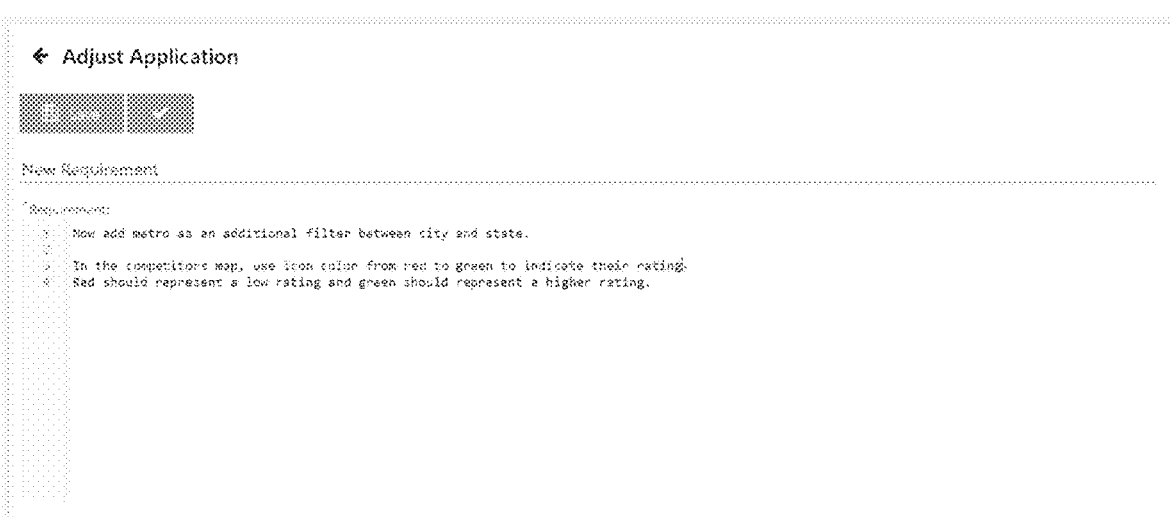
FIG. 14 is an example of an input user interface used to adjust application requirements after the application was generated by the system.

Generated application is deployed (deployed application 12) to servers. The deployed application 12 satisfies the requirements 1. An example of a deployed dashboard application is shown in FIG. 7 and FIG. 8. In some embodiments, end users further fine tune the generated dashboard as shown in FIG. 14.

Figure 15:
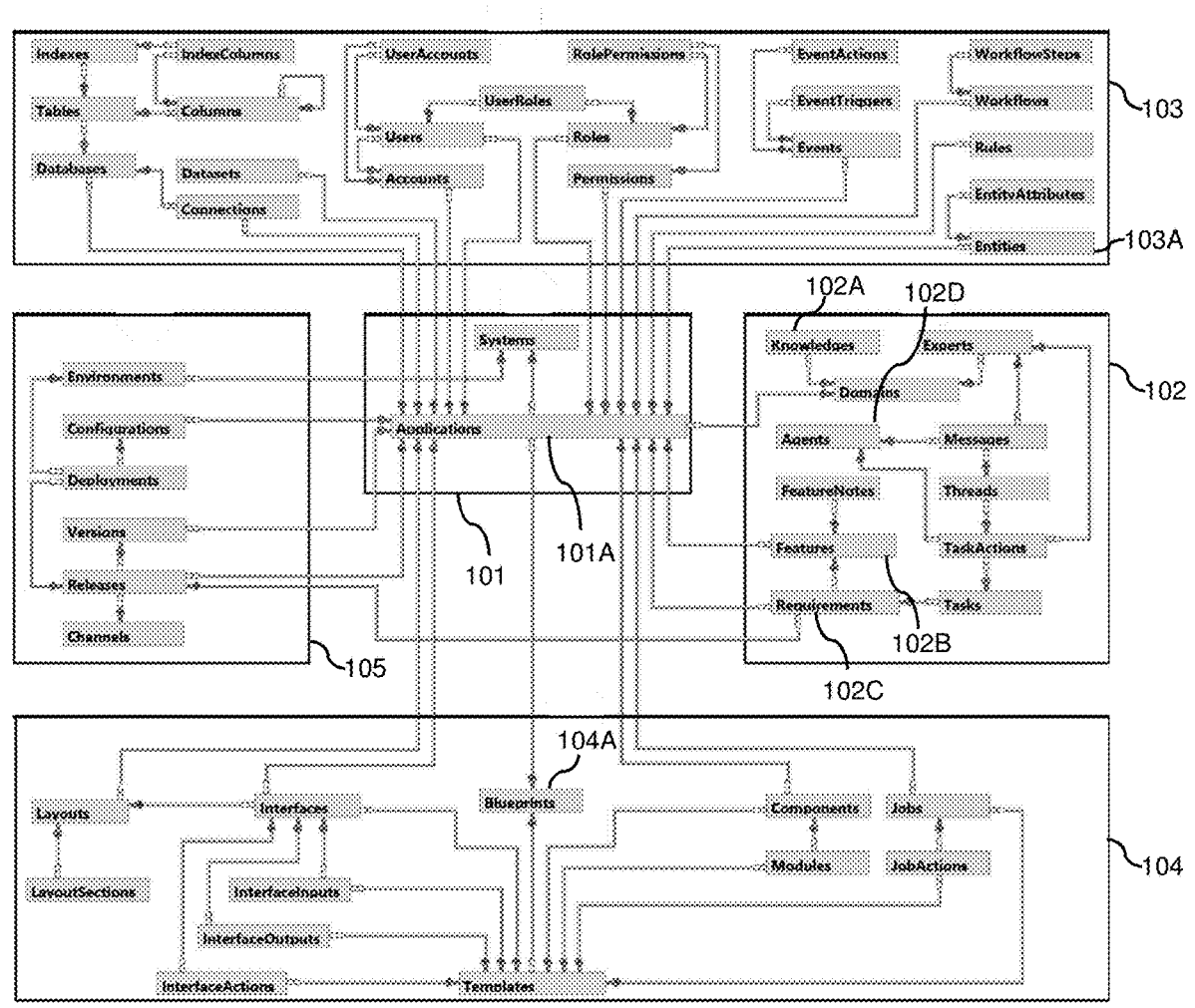
FIG. 15 is an example of building an inventory management application using the system for generating dynamic interactive applications.

Referring to FIG. 15, an example of building an inventory management application using the system for generating dynamic interactive applications is shown.

First a system record is created in the application builder 101 for the team of users who will contribute to the creation and enhancement of the exemplary Inventory management system (IMS). One or more environments and related deployment configuration records are created in tables of the merge module 105.

Initial requirements 102 for the inventory management application are provided in the form of written paragraphs (natural language) along with sample screen designs and audio notes. The initial requirements 102 are fed to the application builder 101. All the above information is split into manageable parts (one part per section or page) and indexed in a vector database where similarity search can be performed to retrieve the most appropriate parts of the complete requirements specification. The detailed requirements are summarized using AI/GPT techniques 103. A summary of the requirements along with relevant application blueprints 104A and domain-specific knowledge 102A stored in the database and are fed to the merge module 105 to create the domain-specific language code generator 6 (see FIG. 1). The initial domain-specific language will result in the creation of the following records in the applications table 101A of the application builder 101:

1.) A master application called Inventory Management System.
2.) A sub application called Inventory Management Web Portal for internal users.
3.) A sub application called Inventory Level Dashboard for vendors.
4.) A sub application called Order Status Dashboard for customers.

Related features and requirements are generated and added to the feature table 102B and the requirement tables 102C. At this point AI agents or skills agents 102D validate the generated information. If any inconsistency is found, additional information from the domain-specific knowledge 102A and skills agents 102D are added and fed through the requirements summarizer 3 (see FIG. 1) and revalidated. In some embodiments, validation is performed by human validator.

For each application, a relevant blueprint 104A is selected. A blueprint 104A contains the code templates to convert an application described in a standardized Domain-specific Language (DSL) into functioning application code. An AI domain-specific language generator 6 (see FIG. 1) is used to convert the validated requirements into a detailed domain-specific language document that can be interpreted by the application builder 7 (see FIG. 1). The process is repeated for each application identified. As part of this process, AI agents or skills agents 102D create necessary entity records 103A, master accounts, application roles, database schema, and external connections.

Generated applications are version stamped and deployed to an appropriate testing environment. A set of automated test cases are run to validate the deployed application. A notification is sent to users to initiate any manual review and validation of the application as in FIGS. 1-9. In some embodiments, additional requirements 104A are added, and existing AI generated requirements 104A can be adjusted and the process repeated until the application satisfies the user requirements.

FIGS. 16-24 show a sample set of inputs for generating an inventory management application.

Figure 16:
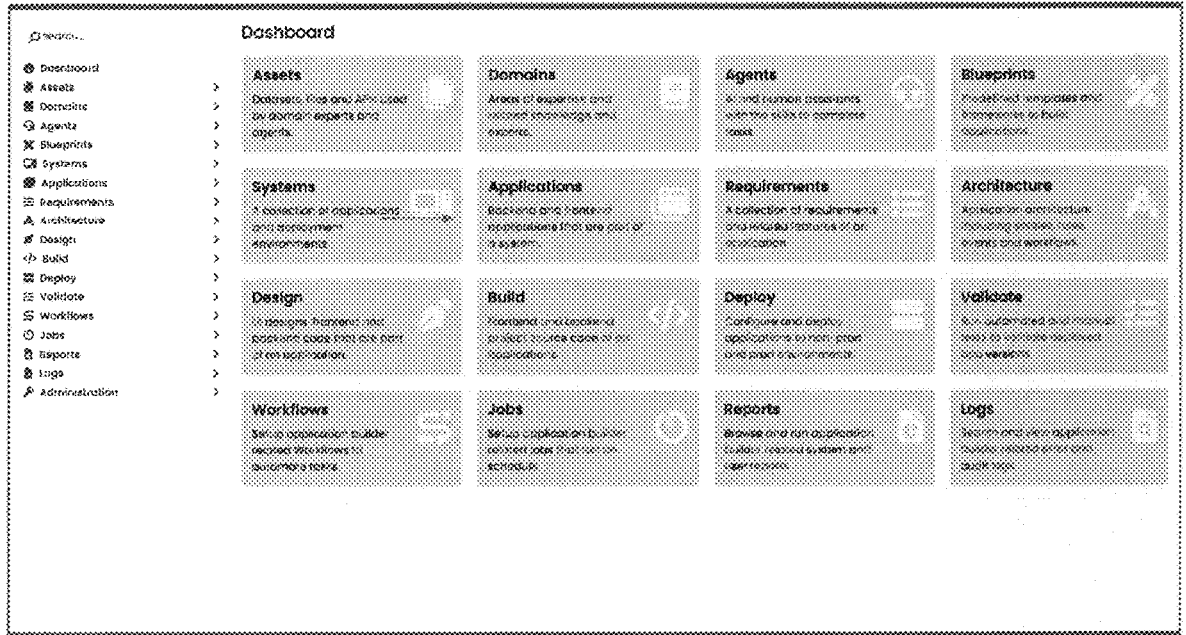
FIG. 16 is an example a dashboard when building the inventory management application using the system for generating dynamic interactive applications.

Referring to FIG. 16, an example a dashboard when building the inventory management application using the system for generating dynamic interactive applications is shown. In this, the overall application is sub-divided into sixteen subcategories including assets, domains, agents, blueprints, systems, applications, requirements, architecture, design, build, deploy, validate, workflows, jobs, reports, and logs.

Referring to FIG. 17, an example set of instructions used when building the inventory management application using the system for generating dynamic interactive applications is shown. For example, the inventory management system will require a database to store inventory data and password protection for users such as employees, suppliers, and customers.

Referring to FIG. 18, an example of the artificial intelligence agents used when building the inventory management application using the system for generating dynamic interactive applications is shown. For example, overall user interface wire frames are provided as a general guidance as to how the user interface will look.

Referring to FIG. 19, an example breakdown of agent tasks used when building the inventory management application using the system for generating dynamic interactive applications is shown. For example, the stakeholders (intended users) are defined such as employees, vendors, and customers.

Referring to FIG. 20, an example set of domain knowledge requirements used when building the inventory management application using the system for generating dynamic interactive applications is shown. In this, existing knowledge in the area of the application is imported such as existing ordering systems, payment and invoicing.

Referring to FIG. 21, an example of datasets that will be needed when building the inventory management application using the system for generating dynamic interactive applications is shown. In this, the requirements include a set of sample data that is required for each component in the dataset. For example, electronic components have a type (e.g., capacitor), sub-category (e.g., ceramic capacitor), value (e.g., 0.01 uF), a price, stocking level, etc.

Referring to FIG. 22, an example of agent skills when building the inventory management application using the system for generating dynamic interactive applications is shown. In this, one aspect is to provide a wire frame for the user interfaces.

Referring to FIG. 23, an example of specialized agents used when building the inventory management application using the system for generating dynamic interactive applications is shown.

Referring to FIGS. 24A, 24B, 24C, and 24D, examples of artificial intelligence agent instructions and responses used when building the inventory management application using the system for generating dynamic interactive applications are shown. These artificial intelligence agent instructions are fed to the artificial intelligence system (e.g., GPT) to generate the application.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A method for generating and enhancing dynamic interactive applications, the method comprising:

receiving, by a requirements receiver, requirements for creating or enhancing an application, the requirements being in a natural language or multimedia format, receiving the requirements by way of user interfaces, the user interfaces comprising including web pages, application interfaces, image input, video input or voice input;

analyzing, by an artificial intelligence based requirements pre-processor, the requirements using artificial intelligence technologies including vector search, machine learning, natural language processing, and large language models to identify data sources that are necessary for querying and updating by the application, wherein the data sources include relational and non-relational databases, data lakes, data marts, data warehouses, data streams, and/or integrations;

enriching the requirements with additional information from domain-specific databases containing metadata related to the data sources, thereby creating enriched requirements;

summarizing, by a requirements summarizer, the enriched requirements and metadata from the data sources to generate final requirements in an artificial intelligence optimized format, iteratively summarizing the enriched requirements until the enriched requirements are within processing capabilities of artificial intelligence including token limits of a large language model-based domain-specific language generator, while minimizing information loss;

using the artificial intelligence including machine learning, natural language processing, and large language models for analyzing the requirements, summarizing the requirements, and domain-specific language generation, thereby creating and enhancing the application from natural language requirements in a dynamic interactive format;

generating, by a domain-specific database enhancer, the application in a domain-specific language using a domain-specific language generator using the artificial intelligence based on the final requirements, wherein the domain-specific language accurately and completely describes the application for understanding and generation by an application generator and the domain-specific language is designed minimizing a number of tokens needed for describing the application to conform to processing capabilities of the artificial intelligence;

deploying the application for end user use on various platforms, the various platforms including web platforms, desktop platforms, and mobile platforms;

reviewing the application through automated system and manual user reviews, ensuring that the application meets the requirements;

accepting feedback comprising user requirements and system requirements for deploying of an updated versions of the application through a feedback loop, wherein the feedback loop is provided in various formats including natural language, encoded, markup, domain-specific, or programming languages;

using version control system to manage application revisions and selecting aspects of the feedback for a usable and deployable version of the application; and continuously enhancing the application by repeating the above steps with new requirements or updated requirements.

2. The method of claim 1, wherein the domain-specific language minimizes the number of tokens needed for describing the application to conform to limitations of the artificial intelligence technologies by designing the domain-specific language to fully describe a functional application while using a least number of tokens possible.

3. The method of claim 1, wherein enriching requirements includes querying domain-specific databases containing metadata related to the data sources including relational and non-relational databases, data lakes, data marts, data warehouses, data streams, application programming interfaces, and integrations, to provide additional context and information for generating the application.

4. The method of claim 1, wherein the dynamic interactive applications are composed of dashboards that include widgets, filters, actions, and links, all arranged in an optimal way for user interaction and data manipulation, and the dashboards receive data from configured data sources in real-time and allow users to update the data through action elements.

5. The method of claim 1, wherein the application supports multiple layouts and themes that are customizable and optimized for different devices, allowing operation across a plurality of platforms.

6. The method of claim 1, further comprising creating jobs for automated actions comprising data import, data export, and data transformation, the jobs are defined within the application based on the requirements and the jobs are pre-configured to perform specific tasks.

7. A system for generating and enhancing dynamic interactive applications comprising:

a requirements receiver configured to receive application requirements in a natural language format from user interfaces, the user interfaces including web pages, application interfaces, and voice input;

an artificial intelligence based requirements pre-processor analyzes and splits requirements using artificial intelligence technologies, the artificial intelligence technologies comprise machine learning, natural language processing, and large language models, to identify data sources that are relevant;

a domain-specific database enhancer enriches the requirements with domain-specific metadata from databases containing information related to the data sources that are identified;

a requirements summarizer utilizes the artificial intelligence technologies to create summarized requirements within artificial intelligence processing limits, the requirements summarizer iterates multiple times to ensure the requirements are within processing capabilities of artificial intelligence including meet an artificial intelligence processor token limit without significant information loss;

using the artificial intelligence including machine learning, natural language processing, and large language models for analyzing the requirements, summarizing the requirements, and domain-specific language generation, thereby creating and enhancing the application from natural language requirements in a dynamic interactive format;

an artificial intelligence technologies domain-specific language code generator creates an application in a domain-specific language based on the summarized requirements, wherein the artificial intelligence technologies domain-specific language code generator uses a multimodal large language model that understands the domain-specific language and generates domain-specific language instructions for application development and the domain-specific language is designed minimizing a number of tokens needed for describing the application to conform to processing capabilities of the artificial intelligence;

an application builder converts the domain-specific language instructions into a deployable functional application including a dashboard configuration database and stores details related to dashboard configurations, widgets, filters, actions, and links;

a version control system manages revisions of the application and selects aspects of the revisions for a usable and deployable version of the application; and a feedback receiver processes additional user requirements and system requirements to enhance the application, the feedback receiver accepts the requirements in various formats including natural language, encoded, markup, domain-specific, and/or programming languages for comprehensive application enhancements based on wide-ranging feedback types.

8. The system of claim 7, wherein the artificial intelligence technologies domain-specific language code generator is constructed using a multimodal large language model that understands and generates the domain-specific language instructions for application development and ensures that the domain-specific language instructions that are generated conforms to the requirements of the system for generating and enhancing dynamic interactive applications and accurately describes the application.

9. The system of claim 7, wherein the application builder includes the dashboard configuration database comprising the details related to the dashboard configurations, widgets, filters, actions, and links, the details used to generate functional applications that run on various platforms, including web platforms, desktop platforms, and mobile platforms.

10. The system of claim 7, wherein the requirements summarizer iterates multiple times to ensure the requirements meet a token limit of the artificial intelligence technologies without significant information loss and adjusts the system for generating and enhancing dynamic interactive applications to preserve essential information while reducing a number of tokens.

11. The system of claim 7, wherein the feedback receiver accepts the requirements in various formats including natural language, encoded, markup, domain-specific, or programming languages; for enhancements to the application based on wide-ranging feedback types, providing for continuous improvement of the application.

* * * * *